Nov. 4, 1969
D. SCARAMUCCI
3,476,356
VALVE AND DUAL-RING SEALS THEREFOR
Filed Jan. 28, 1966
6 Sheets-Sheet 1
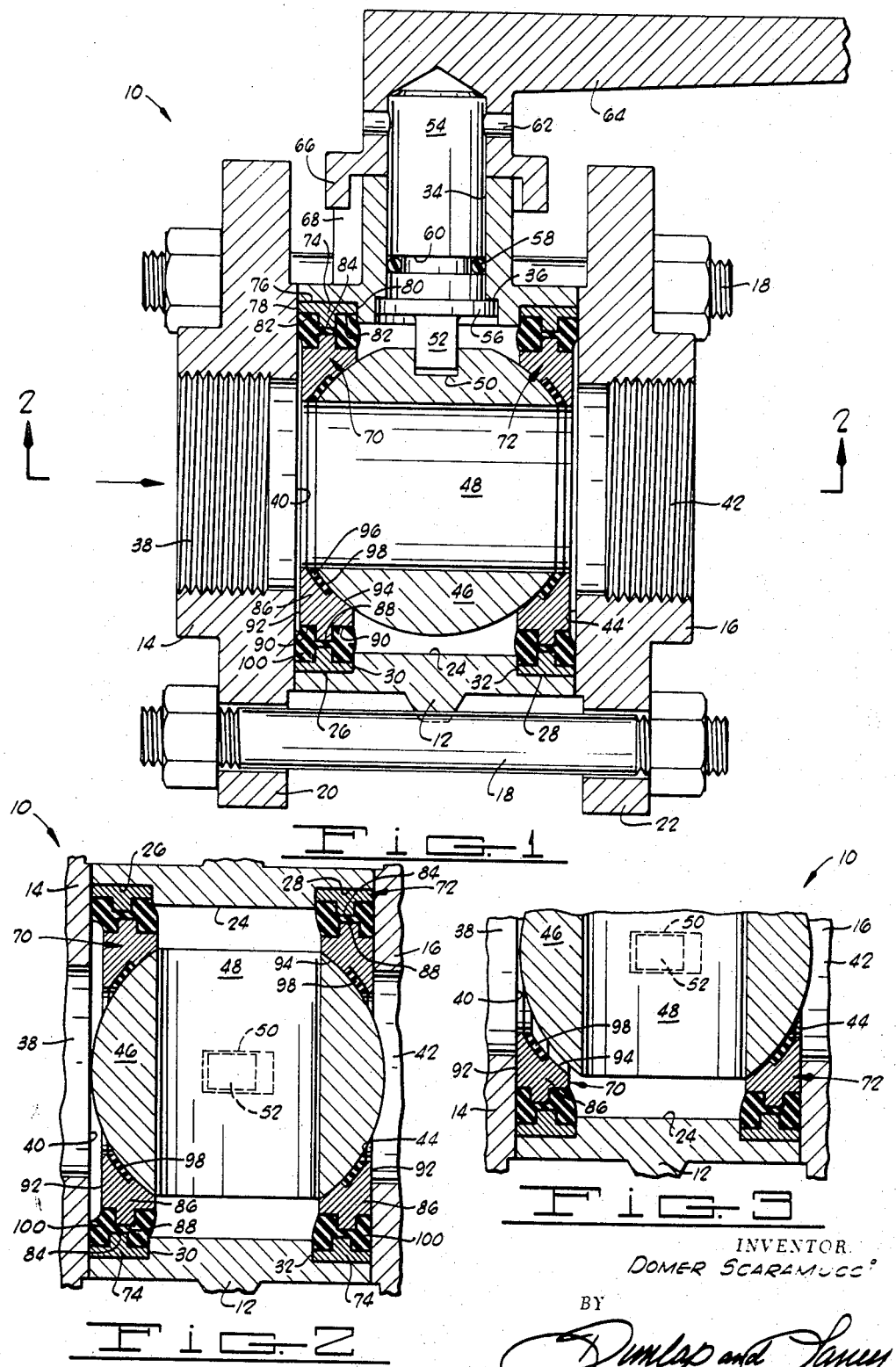
INVENTOR.
DOMER SCARAMUCCI
BY
Dunlap and Laney
ATTORNEYS

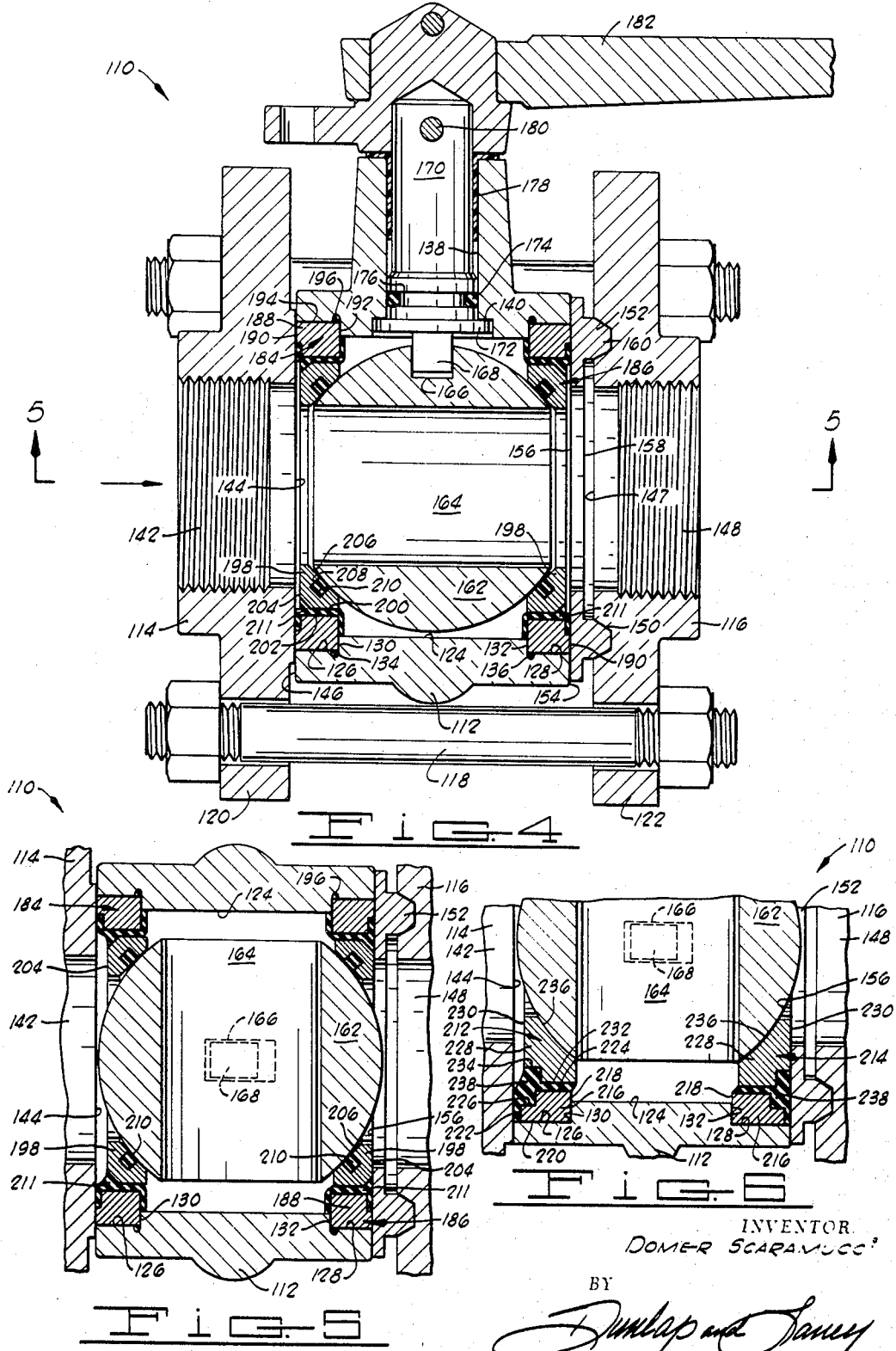

Nov. 4, 1969
D. SCARAMUCCI
3,476,356
VALVE AND DUAL-RING SEALS THEREFOR
Filed Jan. 28, 1966
6 Sheets-Sheet 4
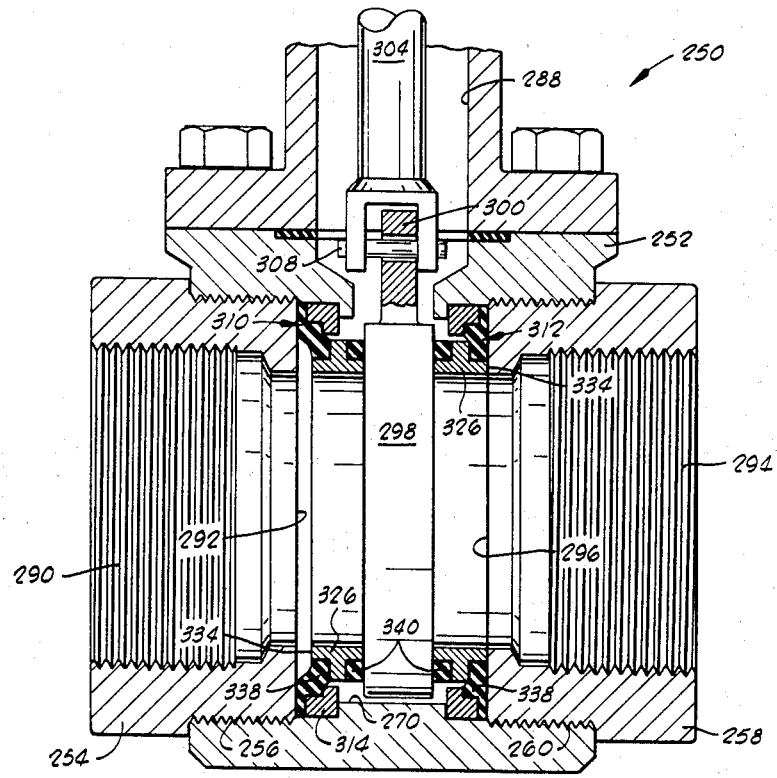
Fig. 9
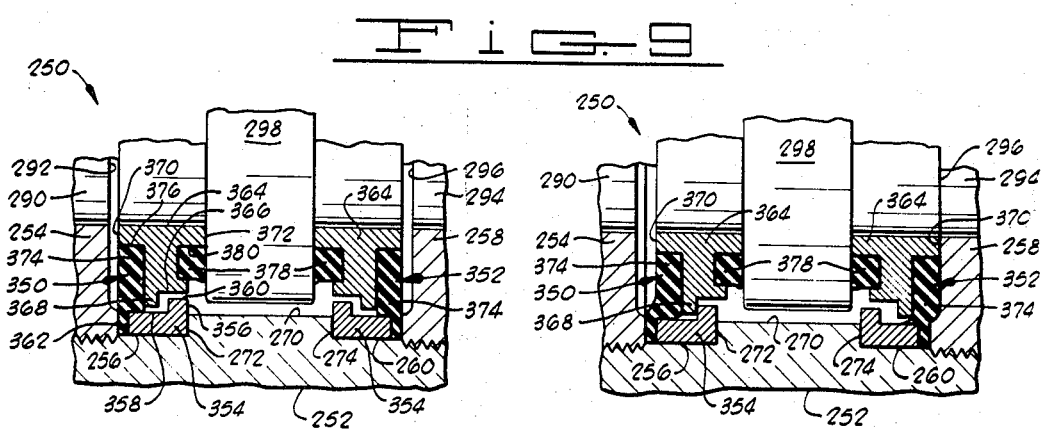
Fig. 10
Fig. 11
INVENTOR.
DOMER SCARAMUCCI
BY
Dunlap and Laney
ATTORNEYS

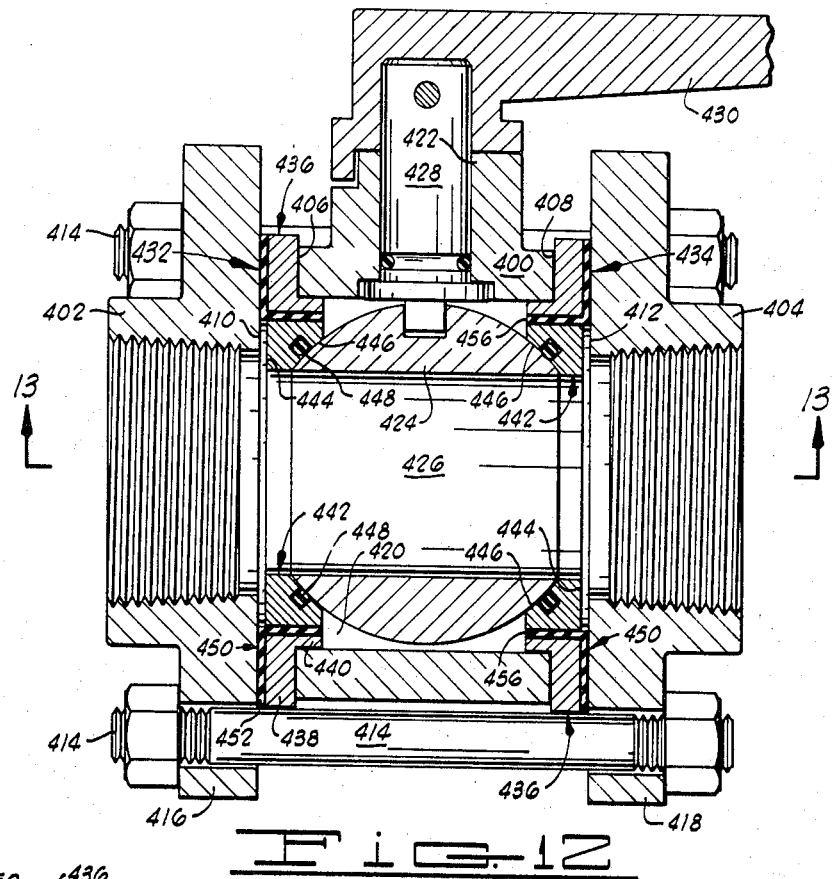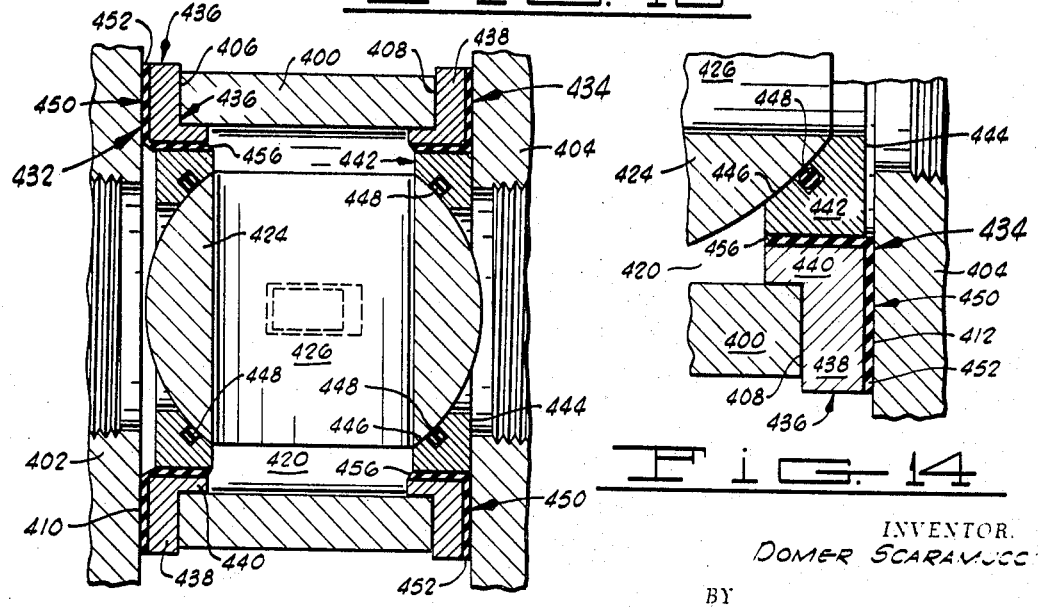

United States Patent Office 3,476,356
Patented Nov. 4, 1969

3,476,356
VALVE AND DUAL-RING SEALS THEREFOR
Domer Scaramucci, Oklahoma City, Okla., assignor to Balon Corporation, Oklahoma City, Okla., a corporation of Oklahoma
Continuation-in-part of application Ser. No. 471,264, July 12, 1965. This application Jan. 28, 1966, Ser. No. 532,041
Int. Cl. F16k 51/00, 25/00
U.S. Cl. 251—151                                27 Claims

ABSTRACT OF THE DISCLOSURE

A valve having a floating valve member and upstream and downstream seats wherein each seat includes an outer rigid ring clamped in place in the respective end of the valve body, a seating ring positioned concentrically inside the outer ring, and an elastomer bonded between and to the rings holding the seating ring against the valve member, yet allowing the seating ring to follow the upstream and downstream movements of the valve member.

---

This application is a continuation-in-part of my application for United States Letters Patent Ser. No. 471,264 filed July 12, 1965, now abandoned. This invention relates generally to valves for controlling the flow of fluid through conduits and the like. More particularly, but not by way of limitation, this invention relates to an improved valve incorporating an improved seal including a pair of relatively rigid reinforcing members that are movable relative to each other to maintain the seal in sealing engagement with a valve member movably located in the valve.

It has been found highly desirable in the design and manufacture of valves to utilize a valve member that is movably mounted in the valve body, that is, a valve member that is movable relatively along the flow passageway through the valve, to avoid the binding or sticking of the valve member when the valve is closed and relatively high pressures are imposed thereon. In the construction of valves having movable valve members therein, the valve member is generally connected with or in engagement with a valve operating member extending into the valve so that relative movement can occur between the valve member and the valve operating member, thereby permitting the movement of the valve member relatively along the flow passageway through the valve.

Manifestly, if the valve member is movable, the seals located in the valve that engage the valve member to form a fluid-tight closure of the valve must be sufficiently flexible to permit the movement of the valve member and yet, support the valve member, when closed, against fluid pressures imposed thereon. If the valve is to be used with relatively low pressures, the seals are generally constructed from a relatively resilient material that deforms as the valve member moves in the valve. If the valve is to be used with relatively high pressure, the resilient seals have most often been provided with a relatively rigid reinforcing member that prevents the extrusion of the resilient seal material from the valve.

Seals constructed from resilient material usually have one peripheral portion thereof clamped in the valve body so that the seals function similar to a diaphragm. Frequently, valve failure occurs due to fluid pressure forcing the resilient material out of the clamping arrangement.

One other method of adapting the valves to relatively high pressure service has been to construct the seals from a resilient, but much harder material. While the harder materials may be more successfully clamped in the valve body, they are less deformable and, therefore, must be constructed with a high degree of accuracy to effectively seal the valve. As a result of the higher degree of accuracy required in constructing the valve, the valve is considerably more expensive. Therefore, it is highly desirable to provide an economic design and construction for a valve that utilizes highly resilient materials for the purpose of maintaining fluid-tight seals therein, while, at the same time, incorporating relatively rigid materials in conjunction with the resilient materials that will support the loads imposed by relatively high fluid pressures on the valve member.

Broadly described, the present invention comprises a valve body having a passageway extending therethrough, a valve closure member movably disposed in the passageway and movable between a position opening the passageway and a position closing the passageway; and sealing means including (a) a relatively rigid ring disposed in the valve body at at least one end of the passageway, (b) an annular seal member disposed generally concentrically within the rigid ring and having a sealing surface thereon for engaging the valve closure member, and (c) an annular resilient member that resiliently interconnects the rigid ring and the annular seal member so that the seal member can move axially in the passageway relative to the rigid ring. The resilient member is configured and dimensioned to bear constantly against a pipe or conduit connection member of fitting which is engaged during the use of the valve with the sides of the valve body at the end of the passageway therethrough. In most constructions, two of the described sealing means will be used, and the valve body will be connected between two pipe or conduit connection members.

In one more specific aspect, this invention provides an improved valve including: a valve body having a passageway extending therethrough and having a counterbore formed in at least one end of the passageway; connection means attached to the valve body for joining the valve to the fluid circuit and having an opening extending therethrough of smaller diameter than the passageway that, when the connection means is attached to the valve body, is in axial alignment with the passageway in the valve body; a valve member disposed in the passageway and movable therein from a position opening the valve to a position closing the valve and movable along the passageway; and, sealing means that includes a relatively rigid ring disposed in the counterbore, an annular seal member disposed generally within the ring and having a surface thereon engaging the valve member, and an annular resilient member that is bonded to the ring and to the seal member so that the seal member is movable relative to the ring, with the resilient member being sized to sealingly engage the connection member when the connection member is assembled with the valve body.

In a different embodiment of the invention, no counterbore is formed in the valve body to receive the relatively rigid ring of the sealing means, but instead this ring is provided with a valve body-engaging flange or shoulder which permits it to be aligned with the passageway through the valve body in substantially the same manner as if the ring-receiving counterbore were provided.

In another aspect, this invention provides a seal useful in valves of the above described type wherein the sea lincludes a relatively rigid ring adapted to be positioned in the passageway through the valve body, a seal member having a surface thereon adapted to sealingly engage the valve member, and an annular resilient member bonded to the ring and to the seal member to permit movement of the seal member relative to the ring. In some embodiments, the rigid ring is specifically adapted to fit in, and be received by, a counterbore formed in the valve body, and in other embodiment, the ring is positioned at the end of the passageway through the valve body, and carries a shoulder or flange which permits it to be aligned in the desired manner with the axis of the passageway.

One object of the invention is to provide an improved valve of the movable valve member type that can be effectively used with relatively high fluid pressures.

Another object of the invention is to provide an improved valve of the movable valve member type that can be easily and economically constructed.

A further object of the invention is to provide an improved valve of the movable valve member type that includes sealing means forming both a fluid-tight upstream and a fluid-tight downstream seal therein.

One other object of the invention is to provide an improved seal for use in valves of the movable valve member type that can be used with relatively high fluid pressures.

A still further object of the invention is to provide an improved seal for use in valves of the movable valve member type that can be quickly and easily installed in the valve.

An additional object of the invention is to provide an improved seal for use in valves of the movable valve member type that is effective to form both fluid-tight upstream and fluid-tight downstream seals when installed in the valve.

Still another object of the invention is to provide an improved seal that can be easily and economically manufactured.

The foregoing and additional objects and advantages of the invention will become more apparent as the following detailed description is read in conjunction with the accompanying drawings wherein like reference characters denote like parts in all views and wherein:

FIG. 1 is a vertical cross-sectional view of a ball valve constructed in accordance with the invention;

FIG. 2 is a horizontal cross-sectional view of the ball valve of FIG. 1 taken substantially along the line 2—2 of FIG. 1, and showing the valve member in another operating position;

FIG. 3 is a fragmentary, cross-sectional view similar to FIG. 2 but illustrating one of the valve seals in still another operating position;

FIG. 4 is a vertical cross-sectional view of another embodiment of ball valve also constructed in accordance with the invention;

FIG. 5 is a fragmentary, horizontal cross-sectional view of the valve of FIG. 4, taken substantially along the line 5—5 of FIG. 4 and showing the valve member in another operating position;

FIG. 6 is a fragmentary, cross-sectional view similar to FIG. 5, but illustrating another embodiment of valve seal located therein;

FIG. 9 is a view similar to FIG. 7, but illustrating the valve member in another operating position;

FIG. 10 is a fragmentary, cross-sectional view of a portion of the valve of FIG. 7, but illustrating another embodiment of seal located therein;

FIG. 11 is a fragmentary, cross-sectional view similar to FIG. 10, but showing the valve member and seals in another operating position;

FIG. 12 is a vertical cross-sectional view of another embodiment of ball valve also constructed in accordance with the invention;

FIG. 13 is a horizontal cross-sectional view of the ball valve of FIG. 12 taken along line 13—13 of FIG. 12, and showing the ball valve in a closed operating position;

FIG. 14 is an enlarged fragmentary, cross-sectional view illustrating in greater detail the structure of the seals used in the valve shown in FIG. 12;

EMBODIMENT OF FIG. 1

Figure 7:
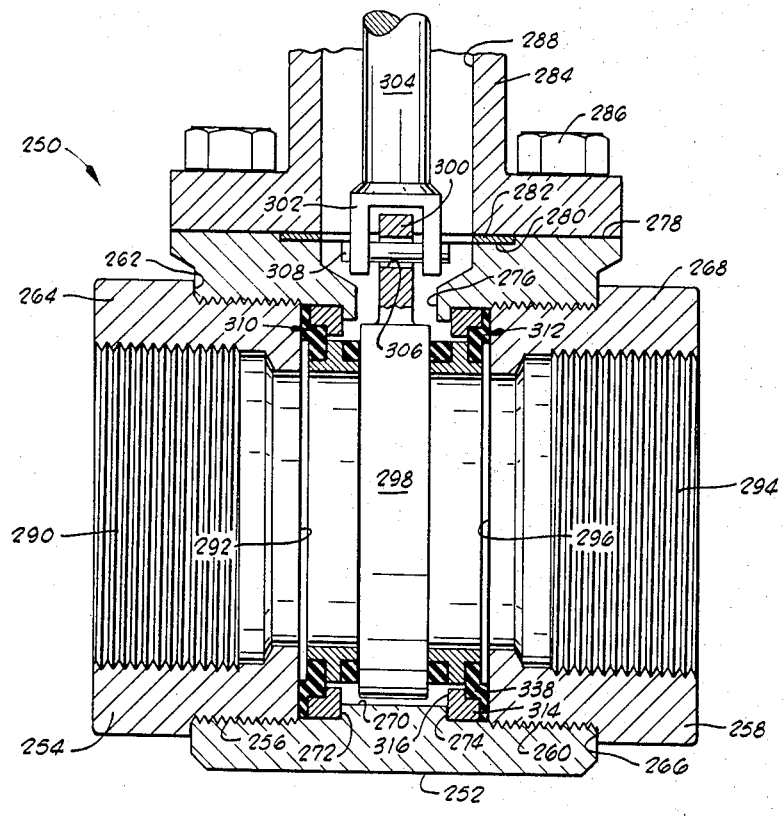
FIG. 7 is a vertical cross-sectional view of a gate valve also constructed in accordance with the invention.

FIG. 1 illustrates a ball valve, generally designated by the reference character 10, that is constructed in accordance with the invention. As shown therein, the ball valve 10 includes a valve body 12 mounted between connecting members 14 and 16. The valve body 12 and connecting members 14 and 16 are held in assembled relation by a plurality of threaded fasteners 18 that extend through flanges 20 and 22 located on the connecting members 14 and 16, respectively. The connecting members 14 and 16 will be referred to hereinafter as the upstream connecting member 14 and the downstream connecting member 16.

The valve body 12 has a passageway 24 extending therethrough and counterbores 26 and 28 formed in each end of the passageway 24. The counterbore 26 forms a shoulder 30 that faces the upstream connecting member 14 and the counterbore 28 forms a shoulder 32 that faces the downstream connecting member 16. An opening 34 extends transversely through the valve body 12 intersecting the passageway 24. At the junction between the opening 34 and the passageway 24, the valve body 12 is spotfaced to provide a downwardly facing shoulder 36.

In addition to the flange 20, the upstream connecting member 14 also includes a partially threaded opening 38 that is aligned with the passageway 24 in the valve body 12. As may be perceived in FIG. 1, the opening 38 is considerably smaller in diameter than either the passageway 24 or the counterbore 26. The upstream connecting member 14 is also provided with an end face 40 that abuts one end of the valve body 12 and faces the shoulder 30 formed therein.

The downstream connecting member 16 also includes a partially threaded opening 42 that is considerably smaller in diameter than the diameter of either the passageway 24 or the counterbore 28. An end face 44 on the downstream connecting member 16 engages the other end of the valve body 12 and faces the shoulder 32 formed therein.

A valve ball 46 is positioned in the passageway 24 and has a flow port 48 extending therethrough. The valve ball 46 is mounted in the valve body 12 for rotation from a position wherein the flow port 48 is aligned with the passageway 24, as illustrated in FIG. 1, to a position wherein the flow port 48 is disposed substantially at right angles to the passageway 24, as illustrated in FIG. 2.

The valve ball 46 also includes a rectangular recess 50 on the exterior thereof for receiving a rectangular lower end 52 of a valve operating member 54. The rectangular recess 50 is, as shown in dash lines in FIG. 2, substantially longer than the rectangular lower end 52 of the valve operating member 54, also shown in dash lines in FIG. 2, to permit the movement of the valve ball 46 relatively along the passageway 24 when the valve ball is in the position illustrated in FIG. 2.

The valve operating member 54 also includes an annular flange 56 disposed within the valve body 12 in engagement with the downwardly facing shoulders 36 to limit the upward travel of the valve operating member 54 therein. An O-ring 58 is disposed in a recess 60 encircling the exterior of the valve operating member 54. The the valve body 12. Also, the resilient member 100 is not susceptible to being extruded from its position between the seal member 86 and the ring 74 on either the upstream or downstream seals 70 and 72 due to the small clearance between the outer periphery 88 on the seal member 86 and the inner periphery 84 on the ring 74.

The ball valve 10 provides the additional feature of relieving excess pressures in the flow port 48 of the valve ball 46 and in the passageway 24 of the valve body 12 when the ball valve 10 is in the closed position. As illustrated in FIG. 3, the seal member 86 of the upstream seal 70 has moved relatively upstream until the end face 92 thereon is in engagement with the end face 40 in the upstream connecting member 14 as a result of a pressure increase in the passageway 24.

With the end face 92 in engagement with the end face 40 of the upstream connecting member 14, it can be clearly seen that the surface 94 and the sealing member 98 carried therein are moved out of engagement with the surface of the valve ball 46. When the disengagement of the surface 94 with the exterior surface of the valve ball 46 occurs, the excess pressure in the passageway 24 is equalized with the pressure in the opening 38 in the upstream connecting member 14 thereby avoiding damage to the ball valve 10 that could result from excess pressure building up in the valve body 12.

EMBODIMENT OF FIG. 4

FIG. 4 illustrates another embodiment of the ball valve generally designated by the reference character 110 and also constructed in accordance with the invention. As shown therein, the ball valve 110 includes a valve body 112 disposed between a pair of connecting member 114 and 116 that will be referred to hereinafter as the upstream connecting member 114 and as the downstream connecting member 116. The valve body 112 and connecting members 114 and 116 are held in assembled relationship by a plurality of threaded fasteners 118 that extend through a flange 120 on the upstream connecting member 114 and a flange 122 on the downstream connecting member 116.

The valve body 112 includes a passageway 124 that extends therethrough. A counterbore 126 is located in the passageway 124 adjacent the upstream connecting member 114. A second counterbore 128 is located in the passageway 124 relatively near the downstream connecting member 116. The counterbore 126 forms a shoulder 130 facing the upstream connecting member 114 and the counterbore 128 forms a shoulder 132 facing the downstream connecting member 116. A pair of annular grooves 134 and 136 are formed in the valve body 112 adjacent the shoulders 130 and 132, respectively, for purposes that will become more apparent hereinafter.

The valve body 112 also includes an opening 138 extending transversely therethrough, intersecting the passageway 124. The valve body 112 is spot-faced at the juncture between the opening 138 and the passageway 124, forming a downwardly facing shoulder 140 therein.

In addition to the flange 120, the upstream connecting member 114 also includes a partially threaded opening 142 extending therethrough. The opening 142 is, when the upstream connecting member 114 is assembled with the valve body 112, axially aligned with the passageway 124. The upstream connecting member 114 also includes an end face 144 disposed in engagement with an end face 146 of the valve body 112.

In addition to the flange 122, the downstream connecting member 116 also includes an end face 147 and a partially threaded opening 148 extending therethrough. An annular groove 150 in the end face 147 encircles the opening 148. The downstream connecting member 116 is commonly referred to as a ring-groove flange.

An adapter ring 152 is disposed between the end face 147 of the downstream connecting member 116 and an end face 154 of the valve body 112. The adapter ring 152 includes an end face 156 that is in engagement with the end face 154 of the valve body 112 and an end face 158 adjacent the end face 147 of the downstream connecting member 116.

An annular flange 160 projects from the end face 158 of the adapter ring 152 and extends axially with respect to the passageway 124 and the opening 148 into the annular groove 150 formed in the downstream connecting member 116. The engagement between the annular flange 160 and the downstream connecting member 116 provides a fluid-tight seal therebetween.

While a different construction of the upstream connecting member 114 and the downstream connecting member 116 has been described, it should be understood that both of the connecting members may be constructed in accordance with the structural description of the upstream connecting member 114. If desired, each of the connecting members may be constructed in accordance with the description of the downstream connecting member 116 and the adapter ring 152.

A valve ball 162 is disposed in the passageway 124 of the valve body 112 and has a flow port 164 extending therethrough that is, as illustrated in FIG. 4, arranged to be aligned with the openings 142 and 148 in the upstream connecting member 114 and the downstream connecting member 116, respectively. The valve ball 162 is rotatable in the passageway 124 to a position wherein the flow port 164 is disposed substantially at a right angle with respect to the passageway 124 wherein the valve 110 is in the closed position substantially as shown in FIG. 5. The valve ball 162 is also movable along the flow passageway 124 to the position illustrated in FIG. 5 when in the closed position and the pressure in the opening 142 is sufficiently high.

The valve ball 162 also includes, on the exterior surface thereof, a rectangular recess 166 that is sized to receive a rectangular lower end 168 of a valve operating member 170. As shown in dash lines in FIG. 5, the rectangular recess 166 is considerably longer than the rectangular end 168 so that the valve ball 162 can move relative to the rectangular end 168 when in the closed position as previously mentioned.

The valve operating member 170 extends through the opening 138 in the valve body 112 and has an annular flange 172 on the lower end thereof that is in engagement with the downwardly facing shoulder 140 in the valve body 112 to limit the upward movement of the valve operating member 170 therein. An O-ring 174 is disposed in an annular groove 176 in the valve operating member 170 in sealing engagement with the valve operating member 170 and with the valve body 112 in the opening 138.

As can be perceived in FIG. 4, the valve operating member 170 is slightly smaller in diameter than the opening 138 to accommodate a sleeve bearing 178 therebetween. The upper end of the valve operating member 170 extending from the sleeve bearing 178 is connected by a pin 180 with an operating handle 182. If desired, though not illustrated, cooperable members can be provided on the valve bore 112 and the operating handle 182 to limit the rotation of the operating handle 182 to approximately 90 degrees.

The valve 110 also includes an upstream seal 184 and a downstream seal 186. The upstream and downstream seals 184 and 186, respectively, are identical in construction though oppositely disposed in the valve body 112. In view of their identity, only the upstream seal 184 will be described in detail, it being understood that like reference characters denote like parts in the downstream seal 186.

The upstream seal 184 includes a ring 188, preferably constructed from a relatively rigid material, such as plastic or metal, disposed in the counterbore 126 in the valve body 112 and having an end face 190 engaging the end face 144 on the upstream connecting member 114. An opposite end face 192 engages the shoulder 130 formed by the counterbore 126 in the valve body 112.

An outer periphery 194 on the ring 188 is in engage-

O-ring 58 is in sealing engagement with the valve operating member 54 and with the valve body 12 in the opening 34 to prevent the escape of fluid therebetween. The upper end of the valve operating member 54 is connected by a pin 62 with an operating handle 64.

The operating handle 64 includes one or more lugs 66 that are engageable with abutments 68 formed on the valve body 12. The cooperative arrangement of the lugs 66 and the abutments 68 limits the rotation of the operating handle 64, valve operating member 54 and the valve ball 46 to approximately 90 degrees.

An upstream seal 70 and a downstream seal 72 are located in the passageway 24 of the valve body 12. The upstream and downstream seals 70 and 72 are identical in construction though oppositely disposed in the ball valve 10. Since the seals 70 and 72 are identical in construction, only the upstream seal 70 will be described in detail, it being understood that the same reference characters refer to the like parts on the downstream seal 72.

The upstream seal 70 includes a ring 74 that is preferably constructed from a rigid material, such as plastic or metal, and is disposed in the connterbore 26 of the valve body 12. An outer periphery 76 of the ring 74 is in engagement with the valve body 12 in the counterbore 26. One end face 78 on the ring 74 is in engagement with the end face 40 on the upstream connecting member 14 and an end face 80 on the ring 74 is in engagement with the shoulder 30 formed in the valve body 12. A pair of spaced recesses 82 are formed in the inner periphery 84 of the ring 74 for purposes that will become more apparent hereinafter.

The upstream seal 70 also includes an annular seal member 86 that is also preferably constructed from a relatively rigid material, such as plastic or metal. The seal member 86 includes an outer periphery 88 disposed within the inner periphery 84 of the ring 74. In the preferred form of constructing the upstream seal 70, the outer periphery 88 of the seal member 86 will be approximately 2 to 5 one-thousandths of an inch less in diameter than the inner periphery 84 of the ring 74.

A pair of spaced recesses 90 in the outer periphery 88 of the seal member 86 are substantially radially aligned with the recesses 82 in the ring 74 when the valve ball 46 is in the position illustrated in FIG. 1. With the seal member 86 in this position, an end face 92 thereon is adjacent but not in engagement with the end face 40 on the upstream connecting member 14.

The seal member 86 also includes a surface 94 configured to fit the exterior of the valve ball 46. A recess 96 formed in the surface 94 receives a resilient, annular sealing member 98 that sealingly engages the exterior surface of the valve ball 46.

The upstream seal 70 also includes a resilient annular member 100 that is bonded to the peripheries 84 and 88 of the ring 74 and the seal member 86, respectively, and in the recesses 82 and 90 formed in the respective members. As can be seen in FIG. 1, the resilient member 100 extends through the clearance between the outer periphery 88 of the seal member 86 and the inner periphery 84 of the ring 74.

The resilient member 100 is sized to sealingly engage the end face 40 of the upstream connecting member 14 and the shoulder 30 formed in the valve body 12. The combined length of the ring 74 and resilient member 100 is greater than the length of the counterbore 26 so that the upstream seal 70 is securely clamped in the valve 10 between the upstream connecting member 14 and the shoulder 30. Also, the resilient member 100 is constructed to bias the seal member 86 toward the valve ball 46, whereby the sealing member 98 sealingly engages the valve ball 46.

OPERATION OF THE EMBODIMENT OF FIG. 1

As illustrated in FIG. 1, the valve ball 46 is in the open position, that is, the flow port 48 therein is aligned with the passageway 24 in the valve body 12 and with the openings 38 and 42 in the upstream and downstream connecting members 14 and 16, respectively. When the valve ball 46 is in the open position, the upstream and downstream seals 70 and 72 are in engagement with the exterior surface of the valve ball 46, retaining the valve ball 46 in a relatively centered position in the ball valve 10.

To close the ball valve 10, the operating handle 64 is rotated approximately 90 degrees, rotating the valve operating member 54 and, through the engagement of the rectangular lower end 52 thereon with the rectangular recess 50 in the valve ball 46, also rotating the valve ball 46 to a position wherein the flow port 48 therein is disposed at a substantially right angle to the passageway 24. In the closed position of the ball valve 10, the valve ball 46 is disposed substantially as shown in FIG. 2.

FIG. 2 illustrates the position of the upstream seal 70, the downstream seal 72, and the valve ball 46 when fluid pressure is applied in the opening 38 in the upstream connecting member 14. As shown therein, the valve ball 46 has moved relatively downstream along the passageway 24, carrying the seal member 86 of the downstream seal 72 therewith until the end face 92 on the downstream seal 72 engages the end face 44 of the downstream connecting member 16. When the end face 92 engages the end face 44, the downstream movement of the valve ball 46 is arrested.

The movement of the valve ball 46 is possible due to the relative sizes of the rectangular recess 50 in the valve ball 46 and the rectangular lower end 52 of the valve operating member 54 as previously described. The seal member 86 on the downstream seal 72 is movable due to the resiliency of the annular resilient member 100 also as previously described.

As can be readily appreciated from viewing FIG. 2, the exterior surface of the valve ball 46 is in sealing engagement with the sealing member 98 located in the surface 94 of the downstream seal 72. Thus, an effective, fluid-tight, downstream seal is formed between the valve ball 46 and the downstream seal 72. Also, no fluid can escape between the valve body 12 and the downstream connecting member 16 due to the sealing engagement of the resilient member 100 with the shoulder 32 in the valve body 12 and with the end face 44 of the downstream connecting member 16.

As may also be seen in FIG. 2, the valve ball 46 is supported against farther downstream movement due to the engagement of the valve ball 46 with the seal member 86 of the downstream seal 72 and the engagement of the end face 92 of the seal member 86 with the end face 44 of the downstream connecting member 16. Therefore, the ball valve 10 can be effectively used even when exceptionally high pressures are present in the circuit with which the valve is connected.

As previously mentioned, the sealing member 98 on the upstream seal 70 is in sealing engagement with the exterior surface of the valve ball 46. As shown in FIG. 2, the sealing engagement between the sealing member 98 and the exterior of the valve ball 46 is maintained during the downstream movement of the valve ball 46. The ability of the upstream seal 70 to maintain its sealing engagement with the valve ball 46 results from the action of fluid pressure on the end face 92 of the seal member 86 on the upstream seal 70. As can be readily perceived in FIG. 2, the fluid pressure in the opening 38 is exerted on the end face 92, deforming the resilient member 100 bonded to the seal member 86 of the upstream seal 70 as the seal member 86 follows the valve ball 46. Thus, an effective fluid-tight upstream seal is also formed in the ball valve 10.

Fluid in the opening 38 is prevented from leaking between the upstream connecting member 14 and the valve body 12 due to the sealing engagement of the resilient member 100 with the end face 40 on the upstream connecting member 14 and with the shoulder 30 formed in ment with the valve body 112 in the counterbore 126. A sealing ring 196, encircling the outer periphery 194 of the ring 188, is disposed in the annular groove 134 formed in the counterbore 126 and sealingly engages the ring 188 and the valve body 112.

The upstream seal 184 also includes a seal member 198 having an outer periphery 200 that is slightly smaller in diameter than an inner periphery 202 of the ring 188. The seal member 198 also includes an end face 204 that faces the end face 144 of the upstream connecting member 114. The seal member 198 is also preferably constructed from a relatively rigid material, such as metal or plastic.

A surface 206 on the seal member 198 has an annular groove 208 formed therein for receiving a resilient, annular sealing member 210. The surface 206 engages the exterior surface of the valve ball 162 holding the sealing member 210 in sealing engagement with the valve ball 162.

A resilient annular member 211 is bonded to the outer periphery 200 of the seal member 198 and is bonded to the inner periphery 202 of the ring 188. As shown clearly in FIGS. 4 and 5, the resilient annular member 211 extends over a portion of the end faces 190 and 192 of the ring 188 and is in sealing engagement with the end face 144 of the upstream connecting member 114. Thus, the assembly of the upstream connecting member 114 with the valve body 112 securely retains the ring 188 and the upstream seal 184 in the counterbore 126. The annular member 211, being constructed from a resilient material, avoids the necessity of extremely close tolerance in constructing the valve body 112 or the ring 188.

As previously mentioned, the downstream seal 186 is constructed identically to the upstream seal 184. However, it should be pointed out that the end face 190 on the downstream seal 186 is in engagement with the end face 156 of the adapter ring 152. Also, the resilient annular member 211 on the downstream seal 186 is in sealing engagement with the end face 156 of the adapter ring 152 thereby securely retaining the downstream seal 186 in the counterbore 128 between the shoulder 132 in the valve body 112 and the adapter ring 152.

OPERATION OF THE EMBODIMENT OF FIG. 4

With the valve ball 162 in the open position, that is, with the flow port 164 therein aligned with the openings 142 and 148 and the upstream and downstream connecting members 114 and 116, respectively, the resilient annular member 211 of the upstream and downstream seals 184 and 186 biases the seal members 198 into engagement with the surface of the valve ball 162 holding the valve ball 162 in a relatively centered position in the valve body 112. To close the valve 110, the operating handle 182 is rotated, rotating the valve operating member 170 therewith and, through the engagement of the rectangular end 168 with the rectangular recess 166 in the valve ball 162, also rotating the valve ball 162 into the position wherein the flow port 164 is disposed at a right angle relative to the passageway 124.

When the valve ball 162 has been rotated to the closed position, fluid pressure in the opening 142 exerts a force on the valve ball 162, moving it relatively downstream and carrying the seal member 198 of the downstream seal 186 therewith until the end face 204 of the downstream seal 186 engages the end face 156 of the adapter ring 152. When this occurs, the downstream movement of the valve ball 162 and the seal member 198 is arrested and the valve ball 162 is in the position illustrated in FIG. 5.

As can be appreciated from viewing FIG. 5, the valve ball 162 is supported by the engagement of the exterior surface thereof with the surface 206 of the seal member 198. The seal member 198 is supported by the engagement of the end face 204 thereon with the end face 156 of the adapter ring 152. Also, it can be appreciated that a fluid-tight downstream seal is formed due to the sealing engagement of the valve ball 162 with the resilient sealing member 210 carried by the downstream seal 186 and due to the sealing engagement between the resilient annular member 211 and the end face 156 of the adapter ring 152. Fluid cannot escape between the ring 188 and the valve body 112 due to the sealing engagement of the sealing ring 196 with the valve body 112 and the ring 188.

An upstream seal is also formed in the valve 110 due to the engagement of the resilient sealing member 210 carried by the upstream seal 184 with the surface of the valve ball 162. As previously mentioned, the resilient annular member 211 of the upstream seal 184 maintains the seal member 198 in engagement with the valve ball 162 while the valve ball 162 is in the relatively centered position in the valve body 112 as shown in FIG. 4. When the valve ball shifts downstream under the influence of pressure in the opening 142, the fluid pressure also exerts a force on the end face 204 of the seal member 198 to move the seal member 198 along with the valve ball 162, thereby maintaining the resilient sealing member 210 in sealing engagement with the valve ball 162. The movement of the seal member 198 is possible due to the resiliency of the annular member 211 of the upstream seal 184.

As is evident from the foregoing and from viewing FIG. 5, a fluid-tight upstream seal is formed between the upstream seal 184 and the valve ball 162. No fluid can escape between the end face 144 of the upstream connecting member 114 and the end face 146 of the valve body 112 due to the sealing engagement of the resilient annular member 211 of the upstream seal 184 with the end face 144 of the upstream connecting member 114.

If fluid should become entrapped in the flow port 164 of the valve ball 162 or in the passageway 124 between the upstream and downstream seals 184 and 186 and a pressure increase occurs therein until such pressure reaches a value exceeding the pressure in the opening 142, the seal member 198 of the upstream seal 184 will be displaced relatively toward the upstream connecting member 114 and away from the surface of the valve ball 162. When this occurs, pressure in the passageway 124 is released and equalizes with the pressure in the opening 142. Thus, it can be seen that the valve 110 provides means for forming fluid-tight upstream and downstream seals as well as releasing any excess pressure that might occur in the valve body 112.

EMBODIMENT OF FIG. 6

FIG. 6 illustrates another embodiment of dual-ring seal installed in the valve 110. As may be perceived therein, an upstream seal 212 and a downstream seal 214 are located in the valve body 112. The upstream and downstream seals 212 and 214 are identical in construction though oppositely disposed in the valve 110 and, due to their identity of construction, only the upstream seal 212 will be described in detail.

The upstream seal 212 includes a ring 216 that is preferably constructed from a relatively rigid material, such as metal or plastic. The ring 216 has an end face 218 in engagement with the shoulder 130 formed in the valve body 112. An outer periphery 220 on the ring 216 is in engagement with the valve body 112 in the counterbore 126 and an end face 222 on the ring 216 faces the end face 144 of the upstream connecting member 114. An inner periphery 224 of the rig 216 has an annular recess 226 formed therein adjacent the end face 222.

The upstream seal 212 also includes a seal member 228 that has an end face 230 adjacent the end face 144 of the upstream connecting member 114. An outer periphery 232 on the seal member 228 includes an annular recess 234 adjacent the end face 230 and disposed relatively adjacent the annular recess 226 formed in the ring 216.

The seal member 228 also includes a surface 236 that is configured to sealingly engage the exterior of the valve ball 162. The surface 236 may have a resilient sealing member (not shown) bonded thereto for sealingly engaging the valve ball 162 if desired.

A resilient annular member 238 is bonded to the outer periphery 232 of the seal member 228 and in the annular recess 234 formed therein. The resilient annular member 238 is also bonded to the inner periphery 224 of the ring 216 and to the annular recess 226 formed therein. The resilient annular member 238 extends over the end face 222 of the ring 216 sealingly engaging the end face 144 of the upstream connecting member 114.

The combined length of the resilient annular member 238 (over the end face 222) and the ring 216 is greater than the length of the counterbore 126 so that the member 238 is deformed when the valve body 112 is assembled with the connecting member 114. Thus, it can be seen that the upstream seal 212 is securely retained in the valve body 112 due to the engagement of the end face 218 of the ring 216 with the shoulder 130 in the valve body 112 and due to the engagement of the resilient annular member 238 with the end face 144 of the upstream connecting member 114. Also, the ability of the member 238 to deform upon assembly of the valve 110, reduces the required manufacturing tolerances of the valve 110.

As previously mentioned, the downstream seal 214 is identical in construction to the upstream seal 212. However, it should be pointed out that the end face 230 of the seal member 228 of the downstream seal 214 is disposed adjacent the end face 156 of the adapter ring 152. Also, the end face 218 of the seal ring 216 engages the shoulder 132 formed in the valve body 112 and the resilient annular member 238 of the downstream seal 214 is in engagement with the end face 156 of the adapter ring 152.

OPERATION OF THE EMBODIMENT OF FIG. 6

As illustrated in FIG. 6, the valve 110 is in the closed position with the valve ball 162 shifted relatively downstream as described in connection with FIG. 5. In this position, the valve ball 162 is in engagement with the surface 236 on the downstream seal 214 and has shifted the seal member 228 of the downstream seal 214 into engagement with the adapter ring 152. Thus, the downstream seal 214 is supporting the valve ball 162 against farther downstream movement. A fluid-tight seal is formed between the valve ball 162 and the surface 236 of the downstream seal 214.

It can also be appreciated that fluid cannot escape between the ring 216 and the valve body 112 due to the engagement of the resilient annular member 238 with the valve body 112 and with the adapter ring 152. Furthermore, the resilient annular member 238 cannot be extruded from the downstream seal 214 due to the bonding of the resilient annular member 238 with the seal ring 216 and with the seal member 228 and also due to the entrapment of the resilient annular member 238 as is clearly illustrated in FIG. 6.

An upstream fluid-tight seal is maintained in the valve 110, as illustrated in FIG. 6, due to the engagement of the surface 236 on the upstream seal 212 with the surface of the valve ball 162. Fluid cannot escape from the opening 142 between the upstream connecting member 114 and the valve body 112 because the resilient annular member 238 is in sealing engagement with the end face 144 of the upstream connecting member 114.

The seal embodiment illustrated in FIG. 6 permits the equalization of fluid pressure entrapped in the passageway 124 as was described in connection with the embodiments of FIG. 1 and FIG. 4. That is, if the pressure increases in the passageway 124 until it is greater than the pressure in the opening 142, the seal member 228 is displaced relatively toward the upstream connecting member 114, providing an opening between the surface 236 and the surface of the valve ball 162 and permitting communication between the opening 142 and the passageway 124.

EMBODIMENT OF FIG. 7

FIG. 7 illustrates a gate valve generally designated by reference character 250 and also constructed in accordance with the invention. The gate valve 250 includes a valve body 252 connected with an upstream connecting member 254 by a partially threaded counterbore 256 and with a downstream connecting member 258 by a partially threaded counterbore 260.

The valve body 252 includes an end face 262 abutting an exterior flange 264 on the upstream connecting member 254. An end face 266 on the valve body 252 engages an exterior flange 268 on the downstream connecting member 258.

As may be clearly seen in FIG. 7, a passageway 270 in the valve body 252 is of slightly smaller diameter than the counterbores 256 and 260 forming a pair of shoulders 272 and 274. The shoulder 272 faces the upstream connecting member 254 and the shoulder 274 faces the downstream connecting member 258.

The valve body 252 also includes an opening 276 extending transversely therethrough, intersecting the passageway 270 and passing through a surface 278 on the upper exterior portion of the valve body 252. The surface 278 has a recess 280 formed therein encompassing the opening 276. The recess 280 is arranged to receive a seal 282 that forms a fluid-tight seal between the valve body 252 and the lower surface of an adapter member 284.

The adapter member 284 is attached to the valve body 252 by a plurality of threaded fasteners 286. An opening 288 in the adapter member 284 is aligned with the opening 276 in the valve body 252 for purposes that will become more apparent hereinafter.

The upstream connecting member 254, in addition to the flange 264, also includes a partially threaded opening 290 and an end face 292 encircling the opening 290 and facing the shoulder 272 in the valve body 252. The downstream connecting member 258 includes a partially threaded opening 294 and an end face 296 encircling the opening 294 and facing the shoulder 274 in the valve body 252.

A valve gate member 298 is disposed in the passageway 270 of the valve body 252 and has its upper end 300 connected with the lower end 302 of a valve operating member 304. The lower end 302 of the valve operating member 304 is bifurcated to receive the upper end 300 of the valve gate member 298. As illustrated in FIG. 7, the upper end 300 of the valve gate member 298 includes an aperture 306 that is slightly larger in diameter than a pin 308 extending through the bifurcated lower end 302 of the valve operating member 304. Thus, the valve gate member 298 is slidable between the bifurcations of the lower end 302 along the pin 308.

Although not shown, it is well known to those skilled in the gate valve art that the valve operating member 304 will be connected to a valve operating handle or equivalent member (not shown) that is arranged to cause the movement of the valve operating member 304 relatively upwardly and downwardly in the opening 288 of the adapter member 284. Also, the adapter member 284 will extend upwardly into cooperative engagement with the valve operating handle (not shown).

The gate valve 250 also includes an upstream seal 310 and a downstream seal 312 mounted in the valve body 252. The upstream and downstream seals 310 and 312 are identical in construction though oppositely disposed in the valve body 252 and, due to their identical construction, only the upstream seal 310 will be described in detail.

Figure 8:
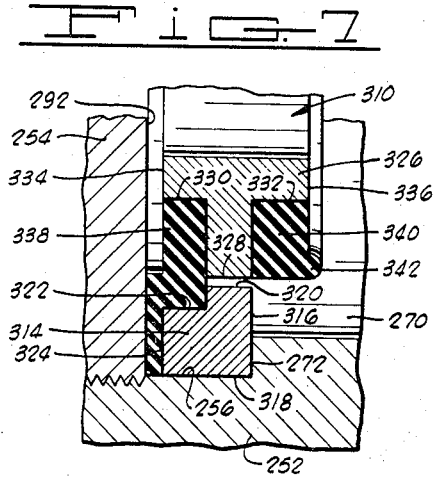
FIG. 8 is an enlarged fragmentary, cross-sectional view illustrating the structure of the seals used in the valve of FIG. 7 in more detail.

As illustrated more clearly in FIG. 8, the upstream seal 310 includes a ring 314, that is preferably constructed from a rigid material, such as a metal or plastic. The ring 314 has an end face 316 that is in engagement with the shoulders 272 in the valve body 252. An outer periphery 318 is in engagement with the counterbore 256 in the valve body 252. The ring 314 also includes an inner periphery 320 having an annular recess 322 formed therein adjacent an end face 324. The end face 324 faces the end face 292 of the upstream connecting member 254.

The upstream seal 310 also includes a seal member 326, also preferably constructed from a relatively rigid plastic or metal, and having an outer periphery 328 that is slightly smaller in diameter than the inner periphery 320 of the ring 316. In constructing the seal member 326 in the ring 316, the difference between the inner periphery 320 of the ring 316 and the outer periphery 328 of the seal member 326 will be approximately 2 to 5 one-thousandths of an inch.

The seal member 326 also includes a pair of spaced annular recesses 330 and 332. The annular recess 330 is located in the seal member 326 adjacent an end face 334 that is adjacent the end face 292 of the upstream connecting member 254. The annular recess 332 is adjacent an end face 336 on the seal member 326 and is disposed adjacent the valve gate member 298 (see FIG. 7).

An annular resilient member 338 is bonded in the annular recess 332 of the ring 316 and in the annular recess 330 of the seal member 326. As may be seen in FIG. 8, the annular resilient member 338 also extends across and is bonded to the end face 324 of the ring 316. When the upstream seal 310 is assembled with the valve body 252, the ring 316 is disposed in the counterbore 256 and the annular resilient member 338 extending across the end face 324 is in sealing engagement with the upstream connecting member 254 and with the valve body 252 in a portion of the counterbore 256. The combined length of the member 338 and the ring 314 is greater than the length of the counterbore 256 (between the shoulder 272 and the end face 292). Thus, the seal 310 is tightly secured in the valve 250.

A resilient sealing member 340 is disposed in the recess 332 and is bonded to the seal member 326. An annular bead 342 projects from the sealing member 340 toward the valve gate member 298 and is engageable with the valve gate member 298 to form a fluid-tight seal therewith. The annular resilient member 338 is constructed so that it biases the seal member 326 into a position wherein the bead 342 is in engagement with the valve gate member 298 to initiate the sealing engagement therebetween and to hold the valve gate member 298 in an approximately centered position in the valve body 252 as shown in FIG. 7.

As previously mentioned, the downstream seal 312 is identical in construction to the upstream seal 310, however, it should be pointed out that when assembled in the gate valve 250, the downstream seal 312 has the annular resilient member 338 thereon in sealing engagement with the end face 296 of the downstream connecting member 258 and with the valve body 252 in the counterbore 260. Also, the ring 314 on the downstream seal 312 has the end face 316 thereon in engagement with the shoulder 274 in the valve body 252.

OPERATION OF THE EMBODIMENT OF FIG. 7

As illustrated in FIG. 7, the gate valve 250 is in the closed position, that is, the valve gate member 298 is in a position blocking flow through the opening 290, the passageway 270 and the opening 294. The seals 310 and 312 and the valve gate member 298 are, as illustrated in FIG. 7, in the positions they occupy when the pressure in the opening 290 is extremely low or there is no pressure therein.

In FIG. 9, the valve gate member 298 has been shifted relatively downstream, that is, toward the downstream connecting member 258 by fluid pressure in the opening 290 of the upstream connecting member 254. The valve gate member 298 can move downstream relative to the operating member 304 due to the structural relationship between the upper end 300 of the valve gate member 298 and the pin 308 carried by the valve operating member 304 as previously described.

As the valve gate member 298 moves downstream, the seal member 326 on the downstream seal 312 is carried therewith until the end face 334 thereon engages the end face 296 of the downstream connecting member 258. When in this position, it can be appreciated that the valve gate member 298 is supported by the downstream connecting member 258 through the seal member 326.

As previously mentioned, the sealing member 340 carried by the downstream seal 312 is in sealing engagement with the valve gate member 298 forming a fluid-tight downstream seal therewith. Also, fluid is prevented from escaping between the seal member 326 and the downstream connecting member 258 by the engagement of the annular resilient member 338 with the end face 296 of the downstream connecting member 258. Fluid in the passageway 270 is also prevented from escaping through the counterbore 260 by the sealing engagement of the annular resilient member 338 with the valve body 252.

The sealing engagement between the sealing member 340 of the upstream seal 310 and the valve gate member 298 is maintained during the downstream movement of the valve gate member 298 because pressure in the opening 290 acts on the end face 334 of the seal member 326 and on the annular resilient member 338 moving the seal member 326 therewith. It should also be pointed out that fluid cannot escape from the opening 290 between the upstream connecting member 254 and the valve body 252 due to the sealing engagement of the annular resilient member 338 with the end face 292 on the upstream connecting member 254.

It is also important to point out that the relatively close fit between the seal member 326 and the ring 314 of the upstream seal 310 functions in combination with the annular resilient member 338 to prevent the extrusion of the annular resilient member 338 therebetween. Thus, it can be appreciated that the construction of the upstream seal 310 maintains a fluid-tight upstream seal with the valve gate member 298 while effectively preventing the extrusion of the annular resilient member 338.

Although not shown, it can be appreciated from viewing FIG. 9 that if the pressure of fluid trapped in the passageway 270 should increase to a value above that in the opening 290, the seal member 326 on the upstream seal 310 is displaced relatively toward the upstream connecting member 254. The movement of the seal member 326 under the influence of pressure in the passageway 270 forms a space between the seal member 326 and the valve gate member 298 to permit the equalization of fluid pressure in the passageway 270 with the fluid pressure in the opening 290.

As will be readily understood by those skilled in the art, the valve gate member 298 is moved to the open position by actuation of the handle or wheel (not shown) that is connected with the valve operating member 304. Movement of the handle (not shown) moves the valve operating member 304 and the attached valve gate member 298 relatively upwardly in the opening 288 until the valve gate member 298 is clear of the passageway 270. When the valve gate member 298 is raised to the described position, fluid can flow through the gate valve 250.

EMBODIMENT OF FIG. 10

FIG. 10 illustrates the application of another embodiment of dual-ring seal in the gate valve 250. As shown therein, an upstream seal 350 and a downstream seal 352 are located in the valve body 252. The seals 350 and 352 are identical in construction through oppositely disposed therein and, due to the identical construction of the seals 350 and 352, only the upstream seal 350 is described in detail. It will be understood that like parts on the downstream seal 352 are designated by the same reference character used in describing the upstream 350.

The upstream seal 350 includes a ring 354 having an end face 356 in engagement with the shoulder 272 formed in the valve body 252. A recess 358 is formed on an inner periphery 360 of the ring 354 adjacent an end face 362 thereon. The end face 362 faces the end face 292 of the upstream connecting member 254. The ring 354 is preferably constructed from a relatively rigid material, such as a metal or plastic.

The upstream seal 350 also includes a seal member 364 having an outer periphery 366 that is slightly smaller in diameter than the inner periphery 360 of the ring 354. An annular flange 368 encircles the outer periphery 366 of the seal member 364 and extends into the recess 358 formed in the ring 354 and is arranged to engage the ring 354. An end face 370 on the seal member 364 is disposed adjacent the end face 292 of the upstream connecting member 254 and an end face 372 on the seal member 364 is arranged to engage the valve gate member 298. The seal member 364 is also preferably constructed from a relatively rigid material, such as metal or plastic.

An annular resilient member 374 is disposed in a recess 376 formed in the end face 370 of the seal member 364 and extends over and is bonded to the end face 362 of the ring 354. The annular resilient member 374 is also bonded to a portion of the recess 358 in the ring 354 and in the recess 376 of the seal member 364. The annular resilent member 374 is in sealing engagement with the valve body 252 in the counterbore 256 and in sealing engagement with the upstream connecting member 254. The combined length of the resilient member 374 and the ring 354 is greater than the length of the counterbore 256 so that the seal 350 is securely retained in the valve 250.

An annular, resilient sealing member 378 is disposed in a recess 380 formed in the end face 372 of the seal member 364. The sealing member 378 is arranged to sealingly engage the valve gate member 298 and if desired, though not shown, may be provided with an annular bead, such as the annular head 342 of the upstream seal 310 as illustrated in FIG. 8.

OPERATION OF THE EMBODIMENT OF FIG. 10

As illustrated in FIG. 10, the valve gate member 298 is in the closed position, that is, it is in a position preventing flow through the gate valve 250. As may be perceived by viewing FIG. 10, the valve gate member 298 is relatively centered with respect to the valve body 252 by the resiliency of the members 374 that are in the position that they will occupy when little or no pressure is present in the gate valve 250. In this position, the annular resilient members 374 bias the seal member 364 into engagement with the valve gate member 298 to initiate the sealing engagement of the sealing members 378 therewith.

When pressure is imposed through the opening 290 in the upstream connecting member 254, the valve gate member 298 moves relatively downstream, as described in connection with FIG. 9. The downstream movement of the valve gate member 298 carries the seal member 364 of the downstream seal 352 therewith until the end face 370 thereon engages the end face 296 of the downstream connecting member 258 as shown in FIG. 11. When this occurs, the downstream movement of the valve gate member 298 and the seal member 364 is arrested and the valve gate member 298 is supported by the downstream connecting member 258 through the seal member 364.

A fluid-tight downstream seal is formed between the sealing member 378 on the downstream seal 352 and the valve gate member 298. Also, fluid is prevented from escaping from the valve body 252 due to the sealing engagement of the resilient annular member 374 on the downstream seal 352 with the downstream connecting member 258 and with the valve body 252 in the counterbore 260. Thus, it can be appreciated that a fluid-tight downstream seal is effectively formed in the gate valve 250 by the downstream seal 352.

The sealing member 378 carried by the upstream seal 350 is maintained in sealing engagement with the valve member 298 during its downstream movement by fluid pressure in the opening 290. The pressure in the opening 290 is exerted on the end face 370 of the seal member 364 and on the resilient annular member 374, thereby deforming the resilient annular member 374 and moving the seal member 364 downstream with the valve gate member 298. Also, fluid in the opening 290 is prevented from escaping the valve body 252 due to the sealing engagement of the annular resilient member 374 with the upstream connecting member 254 and with the valve body 252 in the counterbore 256.

As clearly shown in FIG. 11, the downstream movement of the seal member 364 on the upstream seal 350 is arrested when the annular flange 368 on the seal member 364 engages the ring 354. Thus, while forming a fluid-tight upstream seal with the valve gate member 298, the force that the sealing member 378 exerts on the valve gate member 298 is limited by the engagement of the annular flange 368 with the ring 354 as described.

Therefore, the gate valve 250, with the seals 350 and 352 located therein, is well suited to use with extremely high pressures since the engagement of the flange 368 with the ring 354 limits the amount of force that is exerted on the valve gate member 298. With the force thus limited, the valve gate member 298 may be opened even when extremely high pressures are present in th opening 290.

The pressure between the opening 290 and the passageway 270 is equalized when the pressure in the passageway 270 reaches a value sufficiently high to displace the seal member 364 relatively upstream and away from the valve gate member 298. In this respect, the upstream seal 350 functions as described in connection with the upstream seal 310 of the embodiment of FIG. 7.

EMBODIMENTS OF FIGS. 12–18

FIGS. 12–18 illustrate yet another embodiment of ball valve differing from the hereinbefore described embodiments most importantly in the absence from the valve body of any counterbores for accommodating and positioning the seal structures. FIGS. 15–18 show several types of seal structures which can be employed in the type of ball valve shown in FIGS. 12–14, all of which seal structures are constructed in accordance with the board basic principles of the present invention and retain the advantages of the invention.

Referring initially to FIG. 12, the ball valve includes a valve body 400 which is shown disposed between a pair of connecting members 402 and 404, termed the upstream and downstream connecting members, respectively. The valve body 400 terminates in end faces 406 and 408 which face toward end faces 410 and 412 on the connecting members 402 and 404, respectively. The valve body 400 and connecting members 402 and 404 are held in assembled relationship by a plurality of threaded fasteners 414 that extend through flanges 416 and 418 on the upstream and downstream connecting members 402 and 404, respectively.

The valve body 400 includes a generally cylindrical passageway 420 which extends between the connecting members 402 and 404. A valve stem opening 422 extends through the valve body 400 normal to the axis of the cylindrical passageway 420, and the valve body is spot-faced and counterbored at the juncture between the opening 422 and the passageway 420 as hereinbefore described. A valve ball 424 is rotatably mounted in the passageway 420 of the valve body 400 and has a flow port 426 extending therethrough. The valve ball 420 is rotatable through 90 degrees from its valve opening position as illustrated in FIG. 12 to a valve closing position as illustrated in FIG. 13, such rotation being accomplished by means of a valve operating member 428 and handle 430 as hereinbefore described in referring to other embodiments of the invention.

The ball valve illustrated in FIG. 12–14 further includes an upstream seal 432 and a downstream seal 434. These seals can assume several forms, four of which are illustrated in FIGS. 12–18. Considering initially the seals illustrated in FIGS. 12–14, the upstream and downstream seals 432 and 434 are identically constructed and each include a ring 436 constructed from a relatively rigid material, such as plastic or metal. The ring 436 is generally L-shaped in configuration, having a radially outwardly extending annular flange 438 which abuts the respective end face 406 or 408 of the valve body 400, and an axially extending annular flange 440 which bears against the inner wall of the valve body and extends axially in the passageway 420.

The seals 432 and 434 each further include a relatively rigid annular seal member 442 which is positioned concentrically within the ring 436 and spaced radially inwardly therefrom. The seal member 442 has an end face 444 which faces the respective end face 410 or 412 of the respective connecting member 402 or 404. Each seal member 442 also has an annular surface 446 configured to mate with the outer spherically shaped surface of the valve ball 424. This surface 446 is annularly grooved to accommodate a resilient annular sealing ring 448 which sealingly engages the valve ball 424.

A resilient annular member 450 is interposed between, and bonded to, the ring 436 and seal member 442 of each seal 432 and 434. The resilient annular member 450 is L-shaped and includes a radially outwardly extending leg 452 bonded to the flange 438 of the ring 436 and interposed between this flange and respective end face 410 or 412 of the respective connecting member 402 or 404. The resilient annular member 450 also includes an axially extending leg 456 extending between and bonded to both the ring 436 and the seal member 442. As the seals 432 and 434 are constructed and without the imposition of any distorting fluid forces thereon (e.g., when the valve is open as shown in FIG. 12), the leg 452 of the resilient annular member 450 sealingly engages the end face 410 or 412 of the adjacent connecting member, while the end face 444 of the seal member 442 is spaced from the same end face of the connecting member.

Figure 15:
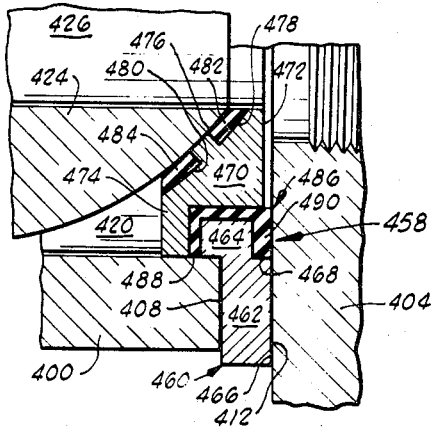
FIG. 15 is an enlarged fragmentary, cross-sectional view of another type of seal which can be used in ball valve illustrated in FIG. 12.
Figure 16:
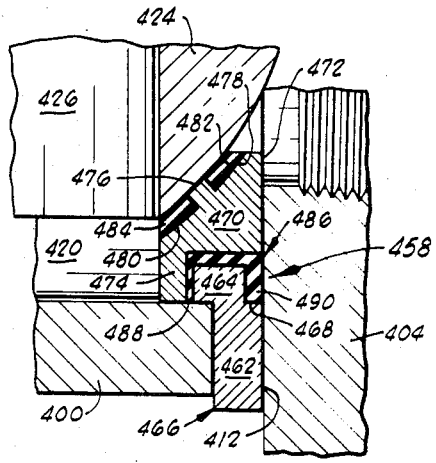
FIG. 16 is a view similar to FIG. 15, but showing the appearance of the seal shown in FIG. 15 in a different operating position of the valve.

In FIGS. 15 and 16, another type of seal useful in the ball valve shown in FIG. 12 is illustrated. The seal is here designated by reference numeral 458, and it will be understood that two such seals are provided in the valve, though for brevity of explanation, only a part of a single seal is shown, and it will be assumed that this is the downstream seal. The seal 458 includes a ring 460 having an annular, radially outwardly extending flange 462 which abuts the end face 408 of the valve body 400, and having an annular, axially extending flange 464 which extends axially in the passageway 420 and bears against the inside wall of the valve body. The flange 462 has a surface 466 which abuts the end face 412 of the connecting member 404. An annular, rectangular cross-section recess 468 is formed in the ring 460 at the radially inner end of the surface 466 for a purpose hereinafter described.

An annular seal member 470 is positioned generally concentrically within the ring 460 and has an end face 472 which faces the end face 412 of the connecting member 404 but is spaced axially therefrom. The seal member also includes a radially outwardly projecting annular flange 474 which extends to the valve body 400 and is spaced from the end of the axially extending flange 464 of the ring 460. The seal member 470 also is provided with a surface 476 configured to mate with the exterior of the valve ball 424. Two spaced annular recesses 478 and 480 formed in this surface accommodate two annular sealing members 482 and 484 which are each substantially trapezoidal in cross-section and sealingly engage the exterior surface of the valve ball 424.

A final element of the seal 458 is the resilient annular member 486 which is bonded to and interconnects the annular seal member 470 and the ring 460. The resilient annular member 486 is generally U-shaped in cross-section and includes a first leg 488 extending between and bonded to the radially outwardly extending flange 474 of the seal member 470 and the axially extending flange 464 of the ring 460, and a second leg 490 extending into the recess 468 and sealingly contacting the end face 412 of the connecting member 404. In its relaxed state the leg 490 extends beyond the plane occupied by the surface 466 of the ring 460, and as this leg is illustrated, it is placed in compression by the connection of the connecting member 404 to the valve body 400.

Figure 17:
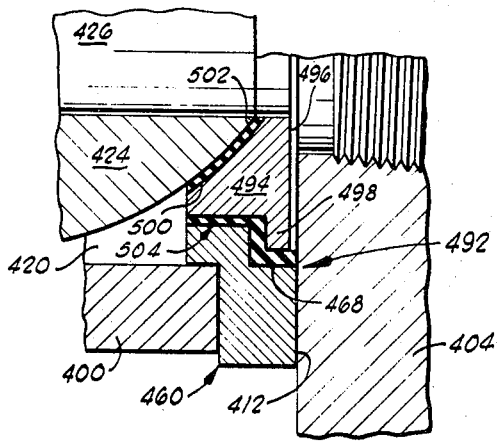
FIG. 17 is an enlarged fragmentary, cross-sectional view of yet another type of seal which can be used in the ball valve illustrated in FIG. 12.

Yet another type of seal useful in the ball valve shown in FIG. 12 is illustrated in FIG. 17. The seal is here designated by reference numeral 492, and two such seals are, of course, provided in the valve construction. The seal 492 includes a rigid ring 460 which is substantially identical in construction to the ring 460 shown in the embodiment of the seal appearing in FIGS. 15 and 16 and therefore has been assigned the same reference numeral, as have its several parts. The rigid ring 460 can be constructed, for example, of metal or plastic.

An annular seal member 494 is positioned concentrically within the rigid ring 460 and has an end face 496 which faces the end face 412 of the connecting member 404 but is spaced axially therefrom. The seal member 494 also includes the radially outwardly projecting annular flange 498 which extends partially into the recess 468 formed in the rigid ring 460 but is spaced both axially and radially therefrom as illustrated in FIG. 17. On its radially inward side, the seal member 494 is provided with a surface 500 configured to mate with a spherical surface. A relatively thin, resilient sealing element 502 which is annular in overall configuration and cross-sectionally configured to mate with the exterior of the valve ball 424 is bonded to the surface 500 of the seal member 494.

A final element of the seal 492 depicted in FIG. 17 is the resilient annular member 504 which is bonded to and interconnects the annular seal member 494 and the rigid ring 460. The resilient annular member 504 is generally S-shaped in configuration and spaces the annular seal member 494 from the rigid ring 460 at all points. It will be noted that the resilient annular member 504 terminates flush with the surface 466 of the rigid ring 460 and thus abuts the end face 412 of the connecting member 404.

Figure 18:
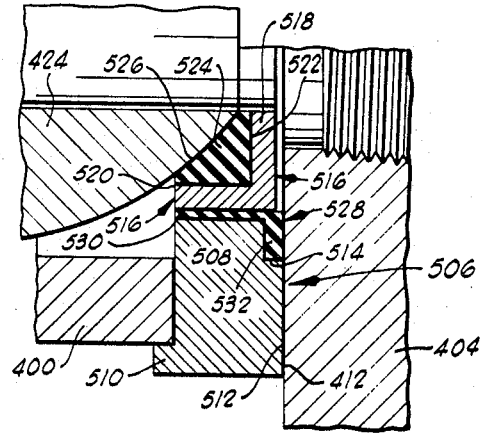
FIG. 18 is an enlarged, fragmentary, cross-sectional view similar to FIG. 17, but showing yet another seal embodiment useful in a ball valve of the type illustrated in FIG. 12.

Another modification of the ring seal which can be utilized in the ball shown in FIG. 12 is the seal 506 illustrated in FIG. 18. As in the other embodiments, the seal 506 includes a rigid ring 508, which in this embodiment of the seal, includes a circumferential flange 510 which projects from the outer periphery of the main body of the ring in an axial direction and bears against the outside of the valve body 400 to position or align the seal 506 at the desired position in the valve assembly. The rigid ring 508 further includes a surface 512 which abuts the end face 412 of the connecting member 404, and is provided with an annular, rectangular cross-sectioned recess 514 at the radially inner end of this surface.

An annular seal member 516 which is generally L-shaped in cross-section is positioned concentrically within the rigid ring 508 and includes a radially inwardly extending leg 518 and an axially extending leg 520. The radially inwardly extending leg 518 is spaced axially from the end face 412 of the connecting member 404 and the axially extending leg 520 is spaced radially inwardly from the rigid ring 508. An annular groove of approximately triangular cross-section 522 is formed by the legs 518 and 520 of the annular seal member 516 and accommodates a resilient sealing element 524. The resilient sealing element 524 has an inner surface 526 which is configured to mate with, and seal against, the external peripheral surface of the valve ball 424.

A resilient annular member 528 of L-shaped cross-sectional configuration is positioned between the annular seal member 516 and the rigid ring 508 and includes an axially extending leg 530 positioned between, and bonded to, the annular seal member 516 and the rigid ring 508. A radially outwardly extending leg 532 of the resilient annular member 530 extends into and fills the recess 514 formed in the rigid ring 508 and is bonded to the surfaces of the ring which define this recess. It is to be noted that the exposed face of the leg 532 of the resilient annular member 528 abuts the end face 412 of the connecting member 404.

OPERATION OF THE EMBODIMENTS ILLUSTRATED IN FIG. 12–18

The operation of the ball valve illustrated in FIG. 12, and of the various seal embodiments which are used in conjunction therewith, and which are illustrated in FIG. 12–18, is very similar to the operation of the ball valves hereinbefore described. The most important difference in the construction of the valve illustrated in FIG. 12, and of the several seals proposed for use in conjunction therewith, is that the valve body 400 is not provided with a counterbore for positioning and locating the seals within the valve body, as is characteristic of the previously described embodiments, but rather the seal structure themselves carry aligning elements in the form of flanges or shoulders which position them accurately with respect to the bore 420 through the valve body 400 and with respect to the valve ball 424.

In referring to the seal element depicted in FIGS. 12–14, the operation of the seal when the ball valve is open and fluid is flowing therethrough is best illustrated by FIGS. 12 and 14. Thus, the valve ball 424 is centered in the valve body 400, and the end faces 444 of the annular seal members 442 are spaced from the respective end faces 410 and 412 of the connecting members 402 and 404. At this time, the radially outwardly extending legs 452 of the resilient annular members 450 bear against the respective end faces 410 and 412 of the connecting members 402 and 404 and form tight seals therewith so that fluid passing through the valve cannot escape between the seals 410 and 412 and the connecting members. The resilient annular sealing rings 448 bear against the periphery of the valve ball 424 and prevent leakage of any fluid between the seals 432 and 434 and the valve ball.

When the valve is closed by rotation of the handle 430 and the operating member 428, the flow port 426 of the valve ball 424 extends perpendicularly with respect to the direction of fluid flow through the valve so that flow is interrupted. After the valve ball 424 has been rotated to the closed position, fluid pressure acting on the upstream side of the valve ball forces it in a downstream direction so as to move the annular seal member 442 of the downstream seal 434 into contact with the end face 412 of the connecting member 404. The downstream movement of the valve ball 424 and the seal member 442 of the downstream seal 434 is then arrested, and the ball and seals occupy the positions illustrated in FIG. 13. As this figure indicates, the valve ball 424 is supported in the valve body 400 by the engagement of the external peripheral surface of the ball with the surface 446 of the annular seal member 442. It will be noted that extrusion of the ball out of the valve body 400 is prevented by the rigid obstruction provided by the annular seal member 442 of the downstream seal 434. Simultaneously, a fluid-tight seal between the ball 424 and the downstream seal 434, as well as between the downstream seal and the end face 412 of the connecting member 404 are provided by resilient sealing ring 448 and the radially outwardly extending leg 452 of the annular resilient member 450.

An upstream seal with the valve ball 424 continues to be maintained by reason of the contact of the resilient sealing ring 448 with the external periphery of the ball. Contact is maintained between the resilient sealing ring 448 and the ball 424 due to the displacement of the annular seal member 442 of the upstream seal 432 in a downstream direction under the impress of fluid pressure upon closing of the valve. The resilient annular member 450 permits this movement of the annular seal member 442 relative to the rigid ring 436 in the upstream seal 432.

In the event of entrapment of fluid in the flow port 426 of the valve ball 424 and in the passageway 420 between the upstream and downstream seals 432 and 434, respectively, a pressure build up resulting from such fluid entrapment is arrested at such time as the fluid pressure in these spaces is equal to or exceeds the value of the pressure acting on the upstream side of the valve through the connecting member 402. At the time when the fluid pressures on opposite sides of the upstream seal 432 are equalized in this manner, the upstream seal will be displaced toward the upstream connecting member 402 and away from the surface of the valve ball 424. When this occurs, the pressure in the passageway 420 is relieved, and the pressures on opposite sides of the seal 432 continue to be equalized and any entrapped fluid can escape if necessary. Thus, as previously explained herein in connection with other embodiments of the invention, the valve construction provides means for forming fluid-tight upstream and downstream seals, for preventing extrusion of the ball from the valve body, and for releasing any excess pressure that might occur within the valve body 400 as a result of entrapment of fluid therein when the valve ball 424 is closed.

The three seal embodiments shown in FIGS. 15–18 function in the same general way as the seal structure which has been described in referring to FIGS. 12–14. Several observations may be made, however, as to slight differences or advantages afforded by the seal structures illustrated in the former figures as compared to the seal structure shown in use in the FIG. 12 valve. Thus, when the annular resilient member interposed between the rigid ring and the annular sealing member takes any of the forms illustrated in FIGS. 15–18, more opportunity is provided for cocking of the valve ball 424 within the valve body 400, since a slight angling of the annular sealing members can, in each case, be accommodated by the body of the annular resilient members which occupies the recesses or indentations formed in the rigid annular rings of the respective seals. It will also be noted in referring to FIGS. 15 and 16 (the latter figure showing the seal in its sealing position) that the radially outwardly extending flange 474 of the annular seal member 470 provides a protective barrier for the annular resilient member which interconnects and spaces the annular seal member from the rigid ring 460, and rupture, severance or excessive wear of this resilient connecting structure as a result of fluid turbulence, or the entrainment of abrasive substances in fluid which may contact this resilient structure is obviated or reduced.

In referring to the seal embodiment shown in FIG. 18, it will be noted that the alignment of the seal 506 with respect to the valve body 400 is accomplished by the circumferential flange 510 which is located externally of the valve body. By reason of this concentration, greater clearance is provided between the valve body 400 and the valve ball 424, and the specific construction of the valve body can thus be altered if circumstances dictate that its internal periphery should conform more closely to the external periphery of the valve ball. Less opportunity is also afforded by this construction for the seal 506 to become undesirably bonded or frozen to the valve body 400 as a result of the development of corrosion at those abutting metallic surfaces within the valve body which are subjected to contact with fluid flowing through the valve.

From the preceding detailed description, it should be apparent that each of the embodiments of seals described herein provides a means of securely retaining the seals in the valves even under extremely high pressures and, yet, provides sufficient flexibility in the seals to effectively form both fluid-tight upstream and downstream seals in the various valves described. Also the possibility of damage to the valves, resulting from an increase in pressure of fluid trapped in the body, is avoided due to the ability of the seals to equalize such pressure when the pressure on the upstream side of the valve is exceeded. Furthermore, the seals described hereinbefore are especially suited to use in relatively high pressure applications because the movable valve members are supported through the rigid seal members even though the seals are sufficiently flexible to maintain fluid-tight seals in the valves while permitting the movement of the valve members to prevent binding thereof.

What I claim is:

1. A valve comprising:
    a valve body having a passageway extending therethrough;
    a valve member disposed in said passageway and movable therein from a position closing said passageway to a position opening said passageway, said valve member also being movable along said passageway in an axial direction toward one end of the passageway;
    pipe connection means connected with said valve body and having an opening extending therethrough aligned with said passageway when said connection means is assembled with said body, said opening being of smaller diameter than said passageway; and
    sealing means disposed in said valve body, said sealing means including:
        a relatively rigid ring positioned at one end of said passageway and having an inner periphery and a portion engaging said valve body around said passageway, and having an end face disposed adjacent said connection means;
        a relatively rigid, annular seal member having an outer periphery dimensioned to fit within the inner periphery of said relatively rigid ring, an end face disposed adjacent said connection means, and a surface configurated to sealingly engage said valve member; and
        an annular, resilient member bonded to said ring and to said seal member to movably position said seal member in said ring, said resilient member having at least a portion thereof in sealing engagement with said connection means when said connection means, valve body and sealing means are assembled;
        wherein said valve body has a counterbore therein at one end of said passageway, and wherein at least a portion of said relatively rigid ring extends into said counterbore and engages said valve body.

2. The valve defined in claim 1 wherein said connection means includes
    a flanged member having an end face engaging said valve body adjacent said counterbore; and
    means connecting said connection member with said valve body.

3. The valve claimed in claim 1 wherein said connection means includes
    a flange member having
        an end face facing said valve body, and an annular groove in said end face;
    an adapter ring having
        an inner periphery smaller in diameter than the diameter of said counterbore,
        an end face engaging said valve body adjacent said counterbore and sealingly engaging said resilient member; and
        an axially-extending, annular flange disposed in said annular groove in sealing engagement with said flanged-member; and
    means connecting said flanged member and adapter ring with said valve body.

4. A valve comprising:
    a valve body having a passageway extending therethrough;
    a valve member disposed in said passageway and movable therein from a position closing said passageway to a position opening said passageway, said valve member also being movable along said passageway in an axial direction toward one end of the passageway;
    pipe connection means connected with said valve body and having an opening extending therethrough aligned with said passageway when said connection means is assembled with said body, said opening being of smaller diameter than said passageway; and
    sealing means disposed in said valve body, said sealing means including:
        a relatively rigid ring positioned at one end of said passageway and having an inner periphery and a portion engaging said valve body around said passageway, and having an end face disposed adacent said connection means;
        a relatively rigid, annular seal member having an outer periphery dimensioned to fit within the inner periphery of said relatively rigid ring, an end face disposed adjacent said connection means, and a surface configured to sealingly engage said valve member; and
        an annular, resilient member bonded to said ring and to said seal member to movably position said seal member in said ring, said resilient member having at least a portion thereof in sealing engagement with said connection means when said connection means, valve body and sealing means are assembled;
    wherein said ring has a flange extending axially with respect to said passageway and positioned to engage said valve body and align and retain said ring in a concentric position with respect to said passageway; and
    wherein said flange is positioned externally of said valve body and said passageway and bears against the exterior of said valve body.

5. A valve comprising:
    a valve body having a passageway extending therethrough;
    a valve member disposed in said passageway and movable therein from a position closing said passageway to a position opening said passageway said valve member also being movable along said passageway in an axial direction toward one end of the passageway;
    pipe connection means connected with said valve body and having an opening extending therethrough aligned with said passageway when said connection means is assembled with said body, said opening being of smaller diameter than said passageway; and
    sealing means disposed in said valve body, said sealing means including:
        a relatively rigid ring positioned at one end of said passageway and having an inner periphery and a portion engaging said valve body around said passageway, and having an end face disposed adjacent said connection means;
        a relatively rigid, annular seal member having an outer periphery dimensioned to fit within the inner periphery of said relatively rigid ring, an end face disposed adjacent said connection means, and a surface configured to sealingly engage said valve member; and
        an annular, resilient member bonded to said ring and to said seal member to movably position said seal member in said ring, said resilient member having at least a portion thereof in sealing engagement with said connection means when said connection means, valve body and sealing means are assembled;
    wherein said ring has a flange extending axially with respect to said passageway and positioned to engage said valve body and align and retain said ring in a concentric position with respect to said passageway; wherein said annular resilient member is generally L-shaped in configuration and has
- a radially outwardly extending leg extending between the end face of said ring and said connection means, and
- an axially extending leg positioned between and bonded to said ring and to said annular seal member.

6. A valve comprising:
a valve body having a passageway extending therethrough;
a valve member disposed in said passageway and movable therein from a position closing said passageway to a position opening said passageway, said valve member also being movable along said passageway in an axial direction toward one end of the passageway;
pipe connection means connected with said valve body and having an opening extending therethrough aligned with said passageway when said connection means is assembled with said body, said opening being of smaller diameter than said passageway; and
sealing means disposed in said valve body, said sealing means including:
- a relatively rigid ring positioned at one end of said passageway and having an inner periphery and a portion engaging said valve body around said passageway, and having an end face disposed adjacent said connection means;
- a relatively rigid, annular seal member having an outer periphery dimensioned to fit within the inner periphery of said relatively rigid ring, an end face disposed adjacent said connection means, and a surface configured to sealingly engage said valve member, and
- an annular, resilient member bonded to said ring and to said seal member to movably position said seal member in said ring, said resilent member having at least a portion thereof in sealing engagement with said connection means when said connection means, valve body and sealing means are asembled;

wherein said ring has a flange extending axially with respect to said passageway and positioned to engage said valve body and align and retain said ring in a concentric position with respect to said passageway; and
wherein said flange is positioned internally of said valve body and said passageway and bears against the interior of said valve body;
wherein said annular resilient member is U-shaped in configuration and has one leg bearing against the free end of said flange, a bight portion interposed between and bonded to said flange and said annular seal member, and another leg extending into a recess formed in the end face of said ring, said other leg sealingly engaging the connection means adjacent said ring.

7. A valve comprising:
a valve body having a passageway extending therethrough and having a counterbore in one end of said passageway;
a valve member disposed in said passageway and movable therein from a position closing said passageway to a position opening said passageway, said valve member also being movable along said passageway;
connection means connected with said valve body and having an opening extending therethrough aligned with said passageway when said connection means is assembled with said body, said opening being of smaller diameter than said passageway; and,
sealing means disposed in said valve body, said sealing means including:

- a relatively rigid ring disposed in said counterbore and having an outer periphery engaging said valve body in said counterbore, a pair of end faces, one being adjacent said valve body and the other adjacent said connection means and each having an annular groove therein, and an inner periphery,
- a relatively rigid, annular seal member having an outer periphery sized to fit closely with the inner periphery of said ring, a pair of spaced annular grooves in said outer periphery substantially aligned radially with the annular grooves in the end faces of said ring, and a surface configured to sealingly engage said valve member, and
an annular resilient member bonded to the inner periphery of said ring, to the outer periphery of said seal member, and to the recesses formed in said ring and seal member, said resilient member sealingly engaging said valve body and said connection means.

8. The valve of claim 7 and also including
a second counterbore formed in the other end of said passageway;
a relatively rigid second ring disposed in said counterbore and having an outer periphery engaging said valve body in said second counterbore, a pair of end faces, one being adjacent said valve body and the other adjacent said connection means adjacent said second counterbore and each having an annular groove therein, and an inner periphery,
a relatively rigid, annular second seal member having an outer periphery sized to fit closely with the inner periphery of said second ring, a pair of spaced annular grooves in said outer periphery substantially aligned radially with the annular grooves in the end faces of said second ring, and a surface configured to sealingly engage said valve member, and
an annular second resilient member bonded to the inner periphery of said second ring, to the outer periphery of said second seal member, and to the recesses formed in said second ring and second seal member, said second resilient member sealingly engaging said valve body and said connection means adjacent said second counterbore.

9. A valve comprising:
a valve body having a first end face, a second end face, and a passageway extending between said end faces;
a valve member disposed in said passageway and movable therein from a position closing said passageway to a position opening said passageway, said valve member also being movable along said passageway;
sealing means at each end of said valve body and on opposite sides of said valve member, said sealing means including:
- rigid rings bearing against each end face of the valve body and each having a portion engaging the valve body for aligning the ring with the passageway through the valve body;
- an annular seal member positioned concentrically within each of said rigid rings;
- annular resilient seal means secured to each of said seal member and sealingly engaging said valve member; and
- an annular resilient member interposed between and bonded to said rigid ring and said annular seal member for permitting relative movement therebetween,
wherein the portion of each of said rigid rings engaging the valve body for alignment of the ring comprises a circumferential flange external of the valve body.

10. A valve comprising:
a valve body having a first end face, a second end face and a passageway extending between said end faces;
a valve member disposed in said passageway and movable therein from a position closing said passageway to a position opening said passageway, said valve member also being movable along said passageway;

sealing means spaced along said passageway and including seals on opposite sides of said valve member, said seals each including:
- a rigid ring including a radially outwardly extending flange bearing against one end face of said valve body, an axially extending flange extending normal to said radially outwardly extending flange and bearing against said valve body for concentrically aligning said ring with said passageway;
- an annular seal member positioned concentrically within and spaced from said ring and having a portion thereof sealingly engaging said valve member;
- a resilient, annular member bonded to said ring and said annular seal member and spacing the ring and annular seal member from each other, and further characterized to include connecting members connected to opposite sides of said valve body and each having an end face facing an end face of said valve body, the end face of each of said connecting members bearing against a portion of one of said resilient, annular members and against the radially outwardly extending flange of one of said rings and being spaced from said annular seal member.

11. A valve as claimed in claim 10 wherein said radially outwardly extending flange has a surface abutting the end face of the respective adjacent connecting member, and further has a recess formed in said surface and receiving the portion of said annular resilient member in contact with said connecting member.

12. A valve comprising:
a valve body having a passageway extending therethrough and having a counterbore in one end of said passageway;
a valve member disposed in said passageway and movable therein from a position closing said passageway to a position opening said passageway, said valve member also being movable along said passageway;
connection means connected with said valve body and having an opening extending therethrough aligned with said passageway when said connection means is assembled with said body, said opening being of smaller diameter than said passageway; and
sealing means disposed in said valve body, said sealing means including
a relatively rigid ring disposed in said counterbore and having an outer periphery engaging said valve body in said counterbore, a first end face engaging said valve body, a second end face engaging said connection means, and having an annular recess therein and an inner periphery,
a relatively rigid, annular seal member having an outer periphery sized to fit closely within the inner periphery of said ring, an end face disposed adjacent said connection means, and a surface configured to sealingly engage said valve member, and
an annular resilient member bonded to the inner periphery of said ring, to the outer periphery of said seal member, and in said annular recess, said resilient member sealingly engaging said connection means.

13. The valve of claim 12 and also including an annular seal disposed between said valve body and the outer periphery of said ring and in sealing engagement with said ring and valve body.

14. A valve comprising:
a valve body having a passageway extending therethrough and having a counterbore in one end of said passageway;
a valve member disposed in said passageway and movable therein from a position closing said passageway to a position opening said passageway, said valve member also being movable along said passageway;
connection means connected with said valve body and having an opening extending therethrough aligned with said passageway when said connection means is assembled with said body, said opening being of smaller diameter than said passageway; and
sealing means disposed in said valve body, said sealing means including:
a relatively rigid ring disposed in said counterbore and having an outer periphery engaging said valve body in said counterbore, an end face disposed adjacent said connection means, and an inner periphery;
a relatively rigid, annular seal member having an outer periphery sized to fit within the inner periphery of said ring, an end face disposed adjacent said connection means, and a surface configured to sealingly engage said valve member; and
an annular, resilient member bonded to said ring and to said seal member to movably position said seal member in said ring, said resilient member extending over at least a portion of the end face of said annular ring in sealing engagement with said connection means when said connection means, valve body, and sealing means are assembled.

15. A valve comprising:
a valve body having a passageway extending therethrough and having a counterbore in one end of said passageway;
a valve member disposed in said passageway and movable therein from a position closing said passageway to a position opening said passageway, said valve member also being movable along said passageway;
connection means connected with said valve body and having an opening extending therethrough aligned with said passageway when said connection means is assembled with said body, said opening being of smaller diameter than said passageway; and
sealing means disposed in said valve body, said sealing means including:
a relatively rigid ring disposed in said counterbore and having an outer periphery engaging said valve body in said counterbore, a first end face engaging said valve body, a second end face facing said connection means and having an annular recess therein, and an inner periphery,
a relatively rigid, annular seal member having an outer periphery sized to fit closely within the inner periphery of said ring, an end face disposed adjacent said connection means and having an annular groove therein, and a surface configured to sealingly engage said valve member, and
an annular resilient member bonded to the outer periphery of said ring, to the inner periphery of said seal member, and to said annular recess and groove, said resilient member being in sealing engagement with said connection means.

16. A valve comprising:
a valve body having a passageway extending therethrough and having a counterbore in one end of said passageway;
a valve member disposed in said passageway and movable therein from a position closing said passageway to a position opening said passageway, said valve member also being movable along said passageway;
connection means connected with said valve body and having an opening extending therethrough aligned with said passageway when said connection means is assembled with said body, said opening being of smaller diameter than said passageway; and
sealing means disposed in said valve body, said sealing means including:
a relatively rigid ring disposed in said counterbore and having an outer periphery engaging said valve body in said counterbore, a first end face in engagement with said valve body, a second end face facing said connection means and having an annular recess therein, and an inner periphery;

a relatively rigid, annular seal member having an outer periphery sized to fit closely in the inner periphery of said ring, an inner periphery encircling said opening, a first end face engageable with said valve member and having an annular recess therein, a second end face engageable with said connection means and having an annular recess therein;

an annular resilient member bonded to the second end face of said ring and to the recesses in the second end faces of said ring and seal member; and a resilient annular seal bonded to the recess in the first end face of said seal member for sealingly engaging said valve member.

17. The valve of claim 16 wherein said seal member also includes a radially projecting annular flange extending into the recess in the second end face of said ring, said flange being engageable with said ring to limit the movement of said seal member relative to said ring.

18. The valve of claim 16 wherein said valve member is an elongated, flat blade movable into and out of said passageway to close and open said passageway, respectively; and wherein said valve also includes a valve operator having one end connection with said blade for moving said blade into and out of said passageway.

19. A seal for use in a valve assembly of the type including a valve body having a substantially cylindrical passageway therethrough and extending between two end faces of the valve body, a valve member movably disposed in the passageway, and a connecting member joined to each side of the valve body and each having an end face facing an end face of the valve body, said seal comprising:

a relatively rigid ring including a radially outwardly extending flange having parallel surfaces adapted to abut the facing end faces of the valve body and one of said connecting members, and further including an axially extending flange extending normal to said radially outwardly extending flange and dimensioned to engage the valve body to align the ring concentrically with the cylindrical passageway through the valve body, said ring further including an inner peripheral portion and an outer peripheral portion;

a relatively rigid annular seal member having at least a portion disposed concentrically within said rigid ring and having a planar end face lying in a plane extending parallel to and spaced from the planes of the parallel surfaces of the outwardly extending flange of said ring, said seal member further having a sealing surface configured to sealingly mate with said valve member; and an annular resilient member bonded to said ring and to said seal member to movably position said seal member relative to said ring and space the seal member from the ring, said annular resilient member having a portion extending from the plane occupied by one of the parallel surfaces of said radially outwardly extending flange of the ring to and beyond the plane occupied by the other parallel surface of said radially outwardly extending flange of the ring for sealing engagement with the end face of the respective adjacent connecting member.

20. A seal as claimed in claim 19 wherein the axially extending flange of said rigid ring is adjacent the outer peripheral portion of the ring.

21. A seal as claimed in claim 19 wherein the axially extending flange of said rigid ring is adjacent the inner peripheral portion of said ring and said annular resilient member includes an axially extending leg positioned between said axially extending flange and said annular seal member and a radially outwardly extending leg covering at least a portion of said radially outwardly extending flange and adapted to be positioned between said radially outwardly extending flange and the end face of one of said connecting members.

22. A seal as claimed in claim 19 wherein said outwardly extending flange has a rectangular cross-sectioned recess formed therein adjacent the inner periphery of said ring and in one of the parallel surfaces, and wherein a portion of said annular resilient member extends into said recess.

23. A seal as claimed in claim 21 wherein said annular seal member further includes a radially outwardly extending flange spaced axially from the axially extending flange of said ring and wherein a portion of said resilient member is positioned between and bonded to the radially outwardly extending flange of said annular seal member and the axially extending flange of said ring.

24. A seal as claimed in claim 22 wherein said annular seal member further includes a radially outwardly extending flange extending into said recess and spaced from said ring and wherein said annular resilient member is Z-shaped in configuration and the portion thereof in said recess is positioned between and bonded to said ring and the radially outwardly extending flange of said seal member.

25. A seal for use in a valve including a valve body having a passageway therethrough, a counterbore in at least one end of the passageway, a valve member movably disposed in the passageway, and connection means joined to at least one end of the valve body, said seal comprising:

a relatively rigid ring arranged to be disposed in the counterbore and having an outer periphery adapted to engage the valve body in the counterbore, an end face disposed adjacent the connection means when the seal is located in the valve, and an inner periphery;

a relatively rigid, annular seal member having an outer periphery sized to fit within the inner periphery of said ring, an end face adapted to be disposed adjacent said connection means, and a surface configured to sealingly engage the valve member; and an annular resilient member bonded to said ring and to said seal member to movably position said seal member relative to said ring, said resilient member extending over at least a portion of the end face of said annular ring and adapted to sealingly engage the connection means when the connection means, valve body, and sealing means are assembled.

26. A seal for use in a valve including a valve body having a passageway therethrough, a counterbore in at least one end of the passageway, a valve member movably disposed in the passageway, and connection means joined to at least one end of the valve body, said seal comprising:

a relatively rigid ring adapted to be disposed in the counterbore and having an outer periphery engageable with the valve body in the counterbore, a first end face adapted to engage the valve body, a second end face facing the connection means when the connection means is joined to the valve body and having an annular recess therein, and an inner periphery;

a relatively rigid annular seal member having an outer periphery sized to fit closely within the inner periphery of said ring, an end face adapted to be disposed adjacent the connection means and having an annular groove therein, and a surface configured to sealingly engage the valve member; and an annular resilient member bonded to the outer periphery of said ring, to the inner periphery of said seal member, and to said annular recess and groove, said resilient member adapted to sealingly engage the connection means when the valve is assembled.

27. A seal for use in a valve including a valve body having a passageway therethrough, a counterbore in at least one end of the passageway, a valve member movably disposed in the passageway, and connection means joined to at least one end of the valve body, said seal comprising:
- a relatively rigid ring adapted to be disposed in the counterbore and having an outer periphery engageable with the valve body in the counterbore, a first end face adapted to engage the valve body, a second end face facing said connection means when said connection means is joined with the valve body and having an annular recess therein, and an inner periphery;
- a relatively rigid, annular seal member having an outer periphery sized to fit closely in the inner periphery of said ring, an inner periphery, a first end face engageable with the valve member and having an annular recess therein, a second end face adapted to engage the connection means and having an annular recess therein;
- an annular resilient member bonded to the second end face of said ring and to the recess in the second end faces of said ring and seal member; and
- a resilient annular seal bonded to the recess in the first end face of said seal member for sealingly engaging the valve member.

References Cited

UNITED STATES PATENTS

| | | | |
|---|---|---|---|
| 2,303,311 | 11/1942 | Grendell | 285—368 X |
| 2,768,806 | 10/1956 | Koehler | 251—317 X |
| 2,857,129 | 10/1958 | Overholser et al. | 251—172 |
| 3,056,577 | 10/1962 | Kulisek | 251—315 |
| 3,202,175 | 8/1965 | Dumm | 251—315 |
| 3,372,901 | 3/1968 | Manor et al. | 251—315 |

FOREIGN PATENTS

| | | |
|---|---|---|
| 1,094,888 | 12/1954 | France. |
| 1,256,802 | 2/1961 | France. |
| 1,278,549 | 10/1961 | France. |
| 619,659 | 11/1932 | Germany. |
| 883,374 | 6/1953 | Germany. |
| 915,764 | 6/1954 | Germany. |

M. CARY NELSON, Primary Examiner

MICHAEL O. STURM, Assistant Examiner

U.S. Cl. X.R.

251—172

PO-1050
(5/69)

UNITED STATES PATENT OFFICE
CERTIFICATE OF CORRECTION

Patent No. __3,476,356__  Dated __November 28, 1969__

Inventor(s) __Domer Scaramucci__

It is certified that error appears in the above-identified patent and that said Letters Patent are hereby corrected as shown below:

In column 3, line 37 "in vention" should be --invention--

In column 15, line 25 "resilent" should be --resilient--.

In column 16, line 42 "board" should be --broad--.

In column 16, line 65 "420" should be --424--.

In column 17, line 53 "cross-section" should be --cross-sectioned--.

In column 17, line 66 "surfrace" should be --surface--.

In column 18, line 44 add --valve-- after "ball"

In column 20, line 56 "concentration" should be --construction--.

In column 20 line 63 "undesriably" should be --undesirabl

In column 21 line 37 "configurated" should be --configure

In column 22 line 18 "adacent" should be --adjacent--.

In column 23 line 3 "resilent" should be --resilient--.

In column 23 line 40 "resilent" should be --resilient--.

SIGNED AND
SEALED
AUG 4 - 1970

(SEAL) 
Attest:

Edward M. Fletcher, Jr.
Attesting Officer

WILLIAM E. SCHUYLER, JR.
Commissioner of Patents